US012326688B2

(12) United States Patent
Yamaai et al.

(10) Patent No.: US 12,326,688 B2
(45) Date of Patent: Jun. 10, 2025

(54) ELECTROPHOTOGRAPHIC PHOTOSENSITIVE MEMBER, PROCESS CARTRIDGE AND ELECTROPHOTOGRAPHIC APPARATUS

(71) Applicant: CANON KABUSHIKI KAISHA, Tokyo (JP)

(72) Inventors: Tatsuya Yamaai, Kanagawa (JP); Kaname Watariguchi, Kanagawa (JP); Kenichi Kaku, Shizuoka (JP); Shuhei Iwasaki, Kanagawa (JP); Akihiro Maruyama, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 466 days.

(21) Appl. No.: 17/814,655

(22) Filed: Jul. 25, 2022

(65) Prior Publication Data

US 2023/0059773 A1 Feb. 23, 2023

(30) Foreign Application Priority Data

Aug. 6, 2021 (JP) ................................. 2021-130197

(51) Int. Cl.
*G03G 5/047* (2006.01)
*G03G 5/05* (2006.01)
(Continued)

(52) U.S. Cl.
CPC ........... *G03G 5/047* (2013.01); *G03G 5/0571* (2013.01); *G03G 5/062* (2013.01); *G03G 5/0696* (2013.01);
(Continued)

(58) Field of Classification Search
CPC ...... G03G 5/047; G03G 5/0571; G03G 5/062; G03G 5/0696; G03G 15/0233; G03G 15/054
See application file for complete search history.

(56) References Cited

U.S. PATENT DOCUMENTS 4,882,257 A 11/1989 Maruyama
4,892,800 A 1/1990 Sugata
(Continued)

FOREIGN PATENT DOCUMENTS

JP 7-331107 A 12/1995
JP 2001-40237 A 2/2001
JP 2017227723 A * 12/2017

OTHER PUBLICATIONS

English machine translation of the description of JP-2017227723-A (Year: 2017).*
(Continued)

*Primary Examiner* — Mark F. Huff
*Assistant Examiner* — Boone Alexander Evans
(74) *Attorney, Agent, or Firm* — VENABLE LLP

(57) ABSTRACT

An electrophotographic photosensitive member includes: a support; an undercoat layer; a charge generation layer; and a charge transport layer, wherein the undercoat layer contains a polyamide resin and a titanium oxide fine particle, and on the surface of the undercoat layer, an arithmetic mean roughness Ra and an average length Rsm of a roughness curve element both according to JIS B0601:2001 satisfy Ra≤50 nm and 0.1≤Ra/Rsm≤0.5; and the charge generation layer contains a hydroxygallium phthalocyanine pigment, wherein the hydroxygallium phthalocyanine pigment includes crystal particles having a crystal form exhibiting peaks at 7.4°±0.3° and 28.2°±0.3° at Bragg angles 2θ in a spectrum of X-ray diffraction using a CuKα, ray; and in a size distribution of the crystal particles, which is measured
(Continued)

using small-angle X-ray scattering, a peak exists in a range of 20 to 50 nm, and the peak has a half-value width of 50 nm or smaller.

9 Claims, 3 Drawing Sheets

(51) Int. Cl.
*G03G 5/06* (2006.01)
*G03G 15/02* (2006.01)
*G03G 15/054* (2006.01)

(52) U.S. Cl.
CPC ....... *G03G 15/0233* (2013.01); *G03G 15/054* (2013.01)

(56) References Cited

U.S. PATENT DOCUMENTS

| | | | |
|---|---|---|---|
| 5,176,976 | A | 1/1993 | Kikuchi |
| 5,352,552 | A | 10/1994 | Maruyama |
| 5,385,797 | A | 1/1995 | Nagahara |
| 5,391,446 | A | 2/1995 | Ohtani |
| 5,391,449 | A | 2/1995 | Maruyama |
| 5,422,210 | A | 6/1995 | Maruyama |
| 5,455,135 | A | 10/1995 | Maruyama |
| 5,484,673 | A | 1/1996 | Kikuchi |
| 5,667,926 | A | 9/1997 | Maruyama |
| 5,677,095 | A | 10/1997 | Kikuchi |
| 5,693,443 | A | 12/1997 | Nakamura |
| 5,729,801 | A | 3/1998 | Maruyama |
| 5,834,149 | A | 11/1998 | Tambo |
| 5,890,037 | A | 3/1999 | Kukimoto |
| 5,923,925 | A | 7/1999 | Nakamura |
| 6,016,414 | A | 1/2000 | Anayama |
| 6,110,628 | A | 8/2000 | Sekiya |
| 6,180,303 | B1 | 1/2001 | Uematsu |
| 6,372,397 | B1 | 4/2002 | Maruyama |
| 6,391,505 | B1 | 5/2002 | Hamasaki |
| 6,416,915 | B1 | 7/2002 | Kikuchi |
| 6,436,597 | B2 | 8/2002 | Maruyama |
| 6,664,014 | B1 | 12/2003 | Kikuchi |
| 7,563,553 | B2 | 7/2009 | Kikuchi |
| 7,585,604 | B2 | 9/2009 | Ogaki |
| 7,910,274 | B2 | 3/2011 | Tanaka |
| 7,927,774 | B2 | 4/2011 | Ogaki |
| 8,465,889 | B2 | 6/2013 | Sekido |
| 8,546,050 | B2 | 10/2013 | Maruyama |
| 8,783,209 | B2 | 7/2014 | Kaku |
| 8,795,936 | B2 | 8/2014 | Sekido |
| 8,841,052 | B2 | 9/2014 | Watariguchi |
| 8,974,991 | B2 | 3/2015 | Kawahara |
| 9,029,054 | B2 | 5/2015 | Okuda |
| 9,034,545 | B2 | 5/2015 | Maruyama |
| 9,063,505 | B2 | 6/2015 | Sekiya |
| 9,068,083 | B2 | 6/2015 | Tanaka |
| 9,069,267 | B2 | 6/2015 | Kaku |
| 9,235,144 | B2 | 1/2016 | Yamamoto |
| 9,274,442 | B2 | 3/2016 | Sato |
| 9,280,071 | B2 | 3/2016 | Maruyama |
| 9,436,106 | B2 | 9/2016 | Kuno |
| 9,436,107 | B2 | 9/2016 | Murakami |
| 9,459,542 | B2 | 10/2016 | Tanaka |
| 9,500,966 | B2 | 11/2016 | Watariguchi |
| 9,507,283 | B2 | 11/2016 | Maruyama |
| 9,535,347 | B2 | 1/2017 | Watariguchi |
| 9,563,139 | B2 | 2/2017 | Kawahara |
| 9,599,917 | B2 | 3/2017 | Okuda |
| 9,645,515 | B2 | 5/2017 | Kuno |
| 9,645,516 | B2 | 5/2017 | Kawahara |
| 9,651,879 | B2 | 5/2017 | Maruyama |
| 9,726,992 | B2 | 8/2017 | Sakuma |
| 9,869,032 | B2 | 1/2018 | Kawahara |
| 10,162,278 | B2 | 12/2018 | Kuno |
| 10,203,617 | B2 | 2/2019 | Kuno |
| 10,303,085 | B2 | 5/2019 | Sato |
| 10,416,581 | B2 | 9/2019 | Ito |
| 10,452,021 | B2 | 10/2019 | Miura |
| 10,539,892 | B2 | 1/2020 | Nishida |
| 10,545,453 | B2 | 1/2020 | Iwasaki |
| 10,558,132 | B2 | 2/2020 | Ishida |
| 10,558,133 | B2 | 2/2020 | Nakamura |
| 10,663,913 | B2 | 5/2020 | Yamaai |
| 10,831,117 | B2 | 11/2020 | Sakakibara |
| 10,831,118 | B2 | 11/2020 | Watanabe |
| 10,942,462 | B2 | 3/2021 | Ito |
| 11,112,719 | B2 | 9/2021 | Makisumi |
| 11,126,097 | B2 | 9/2021 | Ishida |
| 11,137,716 | B2 | 10/2021 | Hiyama |
| 11,150,566 | B2 | 10/2021 | Iwasaki |
| 11,181,837 | B2 | 11/2021 | Sekiya |
| 11,237,493 | B2 | 2/2022 | Makisumi |
| 11,249,407 | B2 | 2/2022 | Watariguchi |
| 11,256,186 | B2 | 2/2022 | Shimozawa |
| 11,340,553 | B2 | 5/2022 | Watariguchi |
| 11,366,402 | B2 | 6/2022 | Ishiduka |
| 11,392,050 | B2 | 7/2022 | Nishida |
| 11,392,074 | B2 | 7/2022 | Ishida |
| 2014/0004450 | A1 | 1/2014 | Tokimitsu |
| 2014/0141362 | A1 | 5/2014 | Watariguchi |
| 2014/0154618 | A1 | 6/2014 | Maruyama |
| 2015/0093693 | A1 | 4/2015 | Watariguchi |
| 2015/0346617 | A1 | 12/2015 | Kawahara |
| 2015/0362847 | A1 | 12/2015 | Tanaka |
| 2020/0064750 | A1* | 2/2020 | Sekido .................. G03G 5/144 |
| 2021/0325793 | A1 | 10/2021 | Nakamura |
| 2021/0325794 | A1 | 10/2021 | Iwasaki |

OTHER PUBLICATIONS

U.S. Appl. No. 17/812,227, filed Jul. 13, 2022, Michiyo Sekiya.
U.S. Appl. No. 17/814,048, filed Jul. 21, 2022, Kaname Watariguchi.
U.S. Appl. No. 17/814,603, filed Jul. 25, 2022, Hideharu Shimozawa.
U.S. Appl. No. 17/815,276, filed Jul. 27, 2022, Akihiro Maruyama.
U.S. Appl. No. 17/816,024, filed Jul. 29, 2022, Kenichi Kaku.
U.S. Appl. No. 17/816,028, filed Jul. 29, 2022, Kohei Makisumi.

* cited by examiner

ELECTROPHOTOGRAPHIC PHOTOSENSITIVE MEMBER, PROCESS CARTRIDGE AND ELECTROPHOTOGRAPHIC APPARATUS

BACKGROUND OF THE INVENTION

Field of the Invention

The present disclosure relates to an electrophotographic photosensitive member, and a process cartridge and an electrophotographic apparatus which use the electrophotographic photosensitive member.

Description of the Related Art

Currently, oscillation wavelengths of semiconductor lasers that are often used as an image exposure unit in the field of electrophotography are such long wavelengths as 650 to 820 nm, and accordingly, the development of an electrophotographic photosensitive member is being promoted that has high sensitivity to light having these long wavelengths.

A phthalocyanine pigment is effective as a charge generation material having the high sensitivity to light up to such a long wavelength region. In particular, oxytitanium phthalocyanine and gallium phthalocyanine have excellent sensitivity characteristics, and various crystal forms have been reported so far.

In Japanese Patent Application Laid-Open No. 2001-40237, it is described that a sensitizing effect is brought about by adding a specific organic electron acceptor in an acid pasting step of the phthalocyanine pigment. However, in this method, there is a concern that an additive (organic electron acceptor) is chemically changed, and there is a problem of having difficulty to modify the phthalocyanine pigment into a desired crystal form in some cases.

In addition, in Japanese Patent Application Laid-Open No. H07-331107, a hydroxygallium phthalocyanine crystal is described that contains a polar organic solvent. It is described that when N,N-dimethylformamide or the like is used as a modification solvent, a molecule of the modification solvent is incorporated into the crystal, and the crystal having high sensitivity characteristics can be obtained.

SUMMARY OF THE INVENTION

In response to a recent rapid increase in a speed of an electrophotographic process, various improvements have been attempted so as to achieve higher sensitivity by the phthalocyanine pigment which is used as a charge generation material of the electrophotographic photosensitive member.

However, according to studies by the present inventors, it has been found that as the speed of the electrophotographic process increases, a transfer memory newly arises as a problem.

The transfer memory in the present disclosure is considered to be generated by such a mechanism as described below.

An electrophotographic process relating to an electrophotographic photosensitive member mainly includes four processes of charging, exposure, development and transfer, and in the case of an electrophotographic apparatus corresponding to recent digitalization, it is common to adopt a reversal development system. In the reversal development, an exposed portion of the electrophotographic photosensitive member is developed by toner, and a charging polarity and a toner polarity become the same. As a result, the charging polarity and a transfer polarity become opposite, and when a negatively charged photosensitive member is used, the transfer is performed with a positive charge having an opposite polarity thereto. Because of this, residual photocarriers generated by the negative charging and subsequent exposure are driven in opposite directions (electrons are driven toward the surface of the photosensitive member and positive holes are driven toward the support of the photosensitive member) by a positive electric field generated by the positive charging at the time of the transfer. As a result, the electrons and the positive holes accumulate in the vicinity of an interface between the charge generation layer and the charge transport layer, and in the vicinity of an interface between the charge generation layer and an undercoat layer, respectively; if the photosensitive member is subjected to the next charging when the electrons and the positive holes are not erased, a sufficient charge potential cannot be obtained, and fogging occurs on an image; and thereby a problem occurs that is called as the transfer memory.

Accordingly, an object of the present disclosure is to provide an electrophotographic photosensitive member that achieves both of suppression of the transfer memory and the high sensitivity, at a high level, and a process cartridge and an electrophotographic apparatus that use the electrophotographic photosensitive member.

The above object is achieved by the following present disclosure.

Specifically, an electrophotographic photosensitive member according to the present disclosure comprises:

a support;

an undercoat layer;

a charge generation layer; and a charge transport layer containing a charge transport material, in this order, wherein the undercoat layer comprises:

a polyamide resin; and a titanium oxide fine particle, on the surface of the undercoat layer, an arithmetic mean roughness Ra and an average length Rsm of a roughness curve element both according to JIS B0601:2001 satisfy the following Expressions (A) and (B):

$$Ra \leq 50\ \text{nm} \qquad \text{Expression (A), and}$$

$$0.1 \leq Ra/Rsm \leq 0.5 \qquad \text{Expression (B),}$$

the charge generation layer comprises a hydroxygallium phthalocyanine pigment, the hydroxygallium phthalocyanine pigment comprises crystal particles having a crystal form that exhibits peaks at 7.4°±0.3° and 28.2°±0.3° at Bragg angles 2θ in a spectrum of X-ray diffraction using a CuKα ray;

in a size distribution of the crystal particles, which is measured using small-angle X-ray scattering, a peak exists in a range of 20 to 50 nm, and the peak has a half-value width of 50 nm or smaller.

In addition, the present disclosure provides a process cartridge that integrally supports the above electrophotographic photosensitive member and at least one unit selected from the group consisting of a charging unit, a developing unit and a cleaning unit, and is detachably attachable to a main body of an electrophotographic apparatus.

In addition, the present disclosure provides an electrophotographic apparatus that includes the above electrophotographic photosensitive member, a charging unit, an exposure unit, a developing unit and a transfer unit.

According to the present disclosure, there can be provided an electrophotographic photosensitive member that can achieve both of high sensitivity required as an electrophotographic photosensitive member in recent years and an effect of suppressing a transfer memory phenomenon at a high level, and a process cartridge and an electrophotographic apparatus which use the electrophotographic photosensitive member.

Further features of the present disclosure will become apparent from the following description of exemplary embodiments with reference to the attached drawings.

DESCRIPTION OF THE EMBODIMENTS

Figure 1:
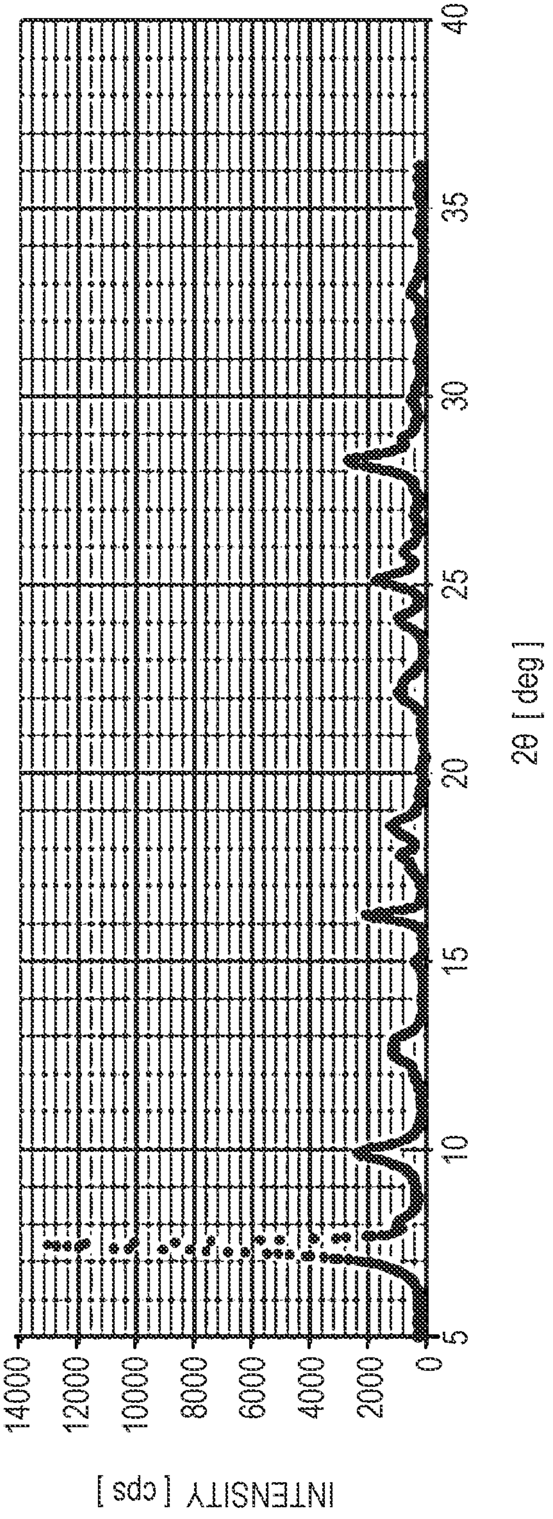
FIG. 1 illustrates a spectrum of the X-ray diffraction of a hydroxygallium phthalocyanine pigment obtained in Example 1, which uses a CuKα ray.

Preferred embodiments of the present disclosure will now be described in detail in accordance with the accompanying drawings.

The present disclosure will be described below in detail, with reference to exemplary embodiments.

An electrophotographic photosensitive member of the present disclosure comprises:

a support;

an undercoat layer;

a charge generation layer; and a charge transport layer containing a charge transport material, in this order, wherein the undercoat layer comprises a polyamide resin; and a titanium oxide fine particle, on the surface of the undercoat layer, an arithmetic mean roughness Ra and an average length Rsm of a roughness curve element both according to JIS B0601:2001 satisfy the following Expressions (A) and (B):

$$Ra \leq 50 \text{ nm} \qquad \text{Expression (A); and}$$

$$0.1 \leq Ra/Rsm \leq 0.5 \qquad \text{Expression (B),}$$

the charge generation layer comprises a hydroxygallium phthalocyanine pigment, the hydroxygallium phthalocyanine pigment comprises crystal particles having a crystal form that exhibits peaks at 7.4°±0.3° and 28.2°±0.3° at Bragg angles 2θ in a spectrum of X-ray diffraction using a CuKα ray, in a size distribution of the crystal particles, which is measured using small-angle X-ray scattering, a peak exists in a range of 20 to 50 nm, and the peak has a half-value width of 50 nm or smaller.

The present inventors assume the reason why the electrophotographic photosensitive member can achieve both the high sensitivity and the suppression of the transfer memory phenomenon at a high level, in the following way.

It is generally known to allow the undercoat layer contain a particle of a metal oxide such as titanium oxide, for the purpose of preventing electric charges from accumulating in the undercoat layer during long-term use of the electrophotographic photosensitive member, and at this time, surface roughness caused by the inclusion of oxide particles on the undercoat layer surface occurs.

One feature of the present disclosure is that the arithmetic mean roughness Ra and an average length Rsm of a roughness curve element according to JIS B0601:2001, on the surface of the undercoat layer containing titanium oxide fine particles, satisfy Ra 50 nm (Expression (A)) and 0.1≤Ra/Rsm≤0.5 (Expression (B)). Furthermore, another feature of the present disclosure is that the hydroxygallium phthalocyanine pigment is used in the charge generation layer, in which in the size distribution of crystal particles, which is measured using small-angle X-ray scattering, a peak exists in a range of 20 to 50 nm, and the peak has a half-value width of 50 nm or smaller. Due to the layers having these features, the scale of recessed portions of unevenness on the surface of the undercoat layer becomes close to the scale of the hydroxygallium phthalocyanine pigment particles. As a result, a contact area increases between the hydroxygallium phthalocyanine pigment and the surface of the undercoat layer, a charge injection efficiency improves between the undercoat layer and the charge generation layer, accumulation of positive charges is suppressed in a transfer process, a sufficient charging potential can be obtained in the next charging process, fogging does not occur on an image, and the transfer memory can be suppressed.

When the Ra is larger than 50 nm or the Ra/Rsm is smaller than 0.1, the scale of the recessed portions of the undercoat layer becomes larger than the scale of the crystal particles of the hydroxygallium phthalocyanine pigment, and the contact area decreases between the hydroxygallium phthalocyanine pigment and the surface of the undercoat layer; and the effect of suppressing the transfer memory cannot be sufficiently obtained. In addition, when the Ra/Rsm is larger than 0.5, the recessed portion of the undercoat layer becomes deep, the hydroxygallium phthalocyanine pigment cannot enter the recessed portion, and a binder resin enters between the undercoat layer and the hydroxygallium phthalocyanine pigment; thereby the contact area decreases between the hydroxygallium phthalocyanine pigment and the surface of the undercoat layer, and the effect of suppressing the transfer memory cannot be sufficiently obtained. When a peak position is larger than 50 nm or the half-value width of the peak is larger than 50 nm, in the size distribution of the crystal particles of the hydroxygallium phthalocyanine pigment, which is measured using the small-angle X-ray scattering, a light-utilization efficiency decreases, thereby the sensitivity decreases; and furthermore, the hydroxygallium phthalocyanine pigment particles increase which have a different scale from that of the recessed portion of the undercoat layer, and accordingly the effect of suppressing the transfer memory cannot also be sufficiently obtained.

[Electrophotographic Photosensitive Member]

Figure 2:
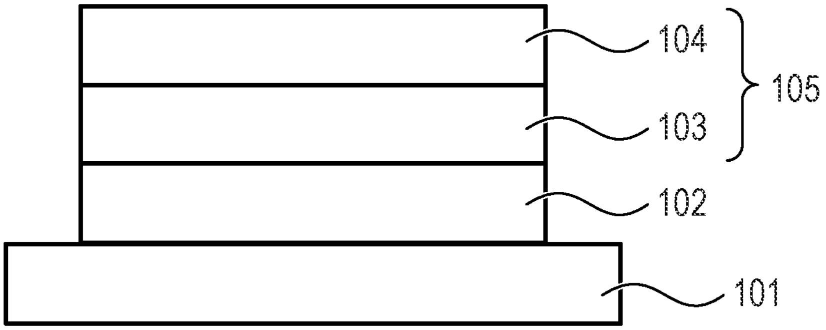
FIG. 2 illustrates a view illustrating one example of a layer constitution of an electrophotographic photosensitive member according to the present disclosure.

The electrophotographic photosensitive member of the present disclosure includes a support, an undercoat layer and a photosensitive layer formed on the undercoat layer. FIG. 2 illustrates a view illustrating one example of a layer constitution of the electrophotographic photosensitive member. In FIG. 2, reference numeral 101 denotes a support, reference numeral 102 denotes an undercoat layer, reference numeral 103 denotes a charge generation layer, reference numeral

104 denotes a charge transport layer, and reference numeral 105 denotes a photosensitive layer (laminate type photosensitive layer).

The support and each layer will be described below.

<Support>

In the present disclosure, it is preferable that the support is an electroconductive support having electroconductivity. Examples of the electroconductive support include: a support formed of a metal such as aluminum, iron, nickel, copper and gold, or an alloy thereof, and a support having any of the thin films formed on an insulative support such as a polyester resin, a polycarbonate resin, a polyimide resin and glass, which are a thin film of a metal such as aluminum, chromium, silver and gold; a thin film of an electroconductive material such as indium oxide, tin oxide and zinc oxide; and a thin film of an electroconductive ink containing a silver nanowire.

In order to improve electric characteristics or suppress interference fringes, the surface of the support may be subjected to electrochemical treatment such as anodic oxidation; wet honing treatment; blasting treatment; cutting treatment; or the like. Examples of the shape of the support include a cylindrical shape and a film shape.

<Electroconductive Layer>

In the present disclosure, an electroconductive layer may be provided on the support. Due to the electroconductive layer being provided, unevenness or defects on the surface of the support can be covered and the interference fringes can be prevented. It is preferable for an average film thickness of the electroconductive layer to be 5 to 40 μm, and is more preferable to be 10 to 30 μm.

It is preferable that the electroconductive layer contains an electroconductive particle and a binder resin. Examples of the electroconductive particle include carbon black, a metal particle and a metal oxide particle. Examples of the metal oxide include zinc oxide, aluminum oxide, indium oxide, silicon oxide, zirconium oxide, tin oxide, titanium oxide, magnesium oxide, antimony oxide and bismuth oxide. Examples of the metal include aluminum, nickel, iron, nichrome, copper, zinc and silver. Among these substances, it is preferable to use metal oxides as the electroconductive particle, and is more preferable to use, in particular, titanium oxide, tin oxide and zinc oxide. When a metal oxide is used as the electroconductive particle, the surface of the metal oxide may be treated with a silane coupling agent or the like, or the metal oxide may be doped with an element such as phosphorus or aluminum, or an oxide thereof. Examples of the element and the oxide thereof to be doped include phosphorus, aluminum, niobium and tantalum. In addition, the electroconductive particle may have a layered structure having a core particle and a covering layer which covers the particle. Examples of the core particle include titanium oxide, barium sulfate and zinc oxide. Examples of the covering layer include metal oxides such as tin oxide and titanium oxide.

In addition, when a metallic oxide is used as the electroconductive particle, it is preferable for a volume-average particle size thereof to be 1 to 500 nm, and is more preferable to be 3 to 400 nm.

Examples of the resin include a polyester resin, a polycarbonate resin, a polyvinyl acetal resin, an acrylic resin, a silicone resin, an epoxy resin, a melamine resin, a polyurethane resin, a phenol resin and an alkyd resin. In addition, the electroconductive layer may further contain a masking agent such as silicone oil, a resin particle, and titanium oxide.

It is preferable for the average film thickness of the electroconductive layer to be 1 to 50 μm, and is particularly preferable to be 3 to 40 μm. The electroconductive layer can be formed by preparing a coating liquid for the electroconductive layer, which contains each of the above materials and a solvent, forming a coating film of the coating liquid on the support, and drying the coating film. Examples of the solvent to be used for the coating liquid include an alcohol-based solvent, a sulfoxide-based solvent, a ketone-based solvent, an ether-based solvent, an ester-based solvent and an aromatic hydrocarbon-based solvent. Examples of a dispersion method for dispersing the electroconductive particles in the coating liquid for the electroconductive layer include methods which use a paint shaker, a sand mill, a ball mill, and a liquid collision type high-speed dispersion machine.

<Undercoat Layer>

An undercoat layer is provided between the support or the electroconductive layer and the charge generation layer. The undercoat layer contains a polyamide resin and a titanium oxide fine particle. As the polyamide resin, a polyamide resin soluble in an alcohol-based solvent is preferable. For example, a ternary (6-66-610) copolymer polyamide, a quaternary (6-66-610-12) copolymer polyamide, N-methoxymethylated nylon, polymerized fatty acid-based polyamide, polymerized fatty acid-based polyamide block copolymer, copolymerized polyamide having a diamine component and the like are preferably used.

It is preferable for a crystal structure of the titanium oxide fine particle to be a rutile-type or anatase-type crystal structure, and is more preferable to be a rutile type of which the photocatalytic activity is weak, from the viewpoint of suppressing the accumulation of electric charges. When the crystal structure is the rutile type, it is preferable that a rutilization rate is 90% or larger. It is preferable that the shape of the titanium oxide fine particle is spherical; and an average primary particle size thereof (number average particle size) is 10 to 120 nm, is preferably 10 to 100 nm, and is more preferably 30 to 60 nm, from the viewpoints of the suppression of the accumulation of the electric charge and uniform dispersibility. The titanium oxide fine particle may be treated with a silane coupling agent or the like, from the viewpoint of the uniform dispersibility.

The undercoat layer in the present disclosure may contain additives such as an organic particle and a leveling agent, in addition to the above polyamide resin and titanium oxide fine particle, for the purpose of enhancing a film-forming property of the undercoat layer of the electrophotographic photosensitive member. However, it is preferable that a content of the additives in the undercoat layer is 10% by mass or less with respect to the total mass of the undercoat layer.

An average film thickness of the undercoat layer is 0.3 to 5 μm, and is preferably 0.5 to 3.0 μm. When the film thickness of the undercoat layer becomes 3.0 μm or smaller, the effect of suppressing the accumulation of the electric charge is further enhanced. When the film thickness of the undercoat layer becomes thinner than 0.3 μm, leakage tends to easily occur due to a local decrease in a charging performance.

The undercoat layer can be formed by preparing a coating liquid for the undercoat layer which contains each of the above materials and a solvent, forming a coating film of the coating liquid on the support or the electroconductive layer, and drying and/or curing the coating film. Examples of the solvent to be used in the coating liquid for the undercoat layer include an alcohol-based solvent, a ketone-based solvent, an ether-based solvent, an ester-based solvent and an aromatic hydrocarbon-based solvent. Examples of a dispersion method for dispersing the titanium oxide fine particles in the coating liquid for the undercoat layer include methods which use ultrasonic dispersion, a paint shaker, a sand mill, a ball mill, and a liquid collision type high speed disperser.

<Charge Generation Layer>

A charge generation layer is provided directly on the undercoat layer. The charge generation layer of the present disclosure is obtained by dispersing the hydroxygallium phthalocyanine pigment of the present disclosure as a charge generation material and optionally a binder resin in a solvent to prepare a coating liquid for the charge generation layer, forming a coating film of the coating liquid for the charge generation layer on the undercoat layer, and drying the coating film.

The coating liquid for the charge generation layer may be prepared by adding only the charge generation material to a solvent, dispersing the charge generation material in the solvent, and then adding the binder resin thereto; or may be prepared by adding the charge generation material and the binder resin together to a solvent, and dispersing the material and the resin in the solvent.

At the time of the above dispersion, a media type dispersing machine such as a sand mill and a ball mill, or a dispersing machine such as a liquid collision type dispersing machine and an ultrasonic dispersing machine can be used.

Examples of the binder resin to be used in the charge generation layer include: resins (insulative resins) such as a polyvinyl butyral resin, a polyvinyl acetal resin, a polyarylate resin, a polycarbonate resin, a polyester resin, a polyvinyl acetate resin, a polysulfone resin, a polystyrene resin, a phenoxy resin, an acrylic resin, a polyacrylamide resin, a polyvinyl pyridine resin, a urethane resin, an agarose resin, a cellulose resin, a casein resin, a polyvinyl alcohol resin, a polyvinyl pyrrolidone resin, a vinylidene chloride resin, an acrylonitrile copolymer and a polyvinyl benzal resin. In addition, organic photoconductive polymers such as poly-N-vinyl carbazole, polyvinyl anthracene and polyvinyl pyrene can also be used. In addition, as for the binder resin, only one type may be used, or two or more types may be used in combination, as a mixture or a copolymer.

Examples of the solvent to be used in the coating liquid for the charge generation layer include: toluene, xylene, tetralin, chlorobenzene, dichloromethane, chloroform, trichloroethylene, tetrachloroethylene, carbon tetrachloride, methyl acetate, ethyl acetate, propyl acetate, methyl formate, ethyl formate, acetone, methyl ethyl ketone, cyclohexanone, diethyl ether, dipropyl ether, propylene glycol monomethyl ether, dioxane, methylal, tetrahydrofuran, water, methanol, ethanol, n-propanol, isopropanol, butanol, methyl cellosolve, methoxypropanol, dimethyl formamide, dimethyl acetamide and dimethyl sulfoxide. In addition, as for the solvent, one type can be used alone, or two or more types can be used in combination.

An average film thickness of the charge generation layer of the present disclosure is 0.15 μm or larger, and is preferably 0.2 μm or larger.

(Hydroxygallium Phthalocyanine Pigment)

In the present disclosure, the charge generation material contains a hydroxygallium phthalocyanine pigment. The hydroxygallium phthalocyanine pigment may have an axial ligand or a substituent. The present disclosure includes that the hydroxygallium phthalocyanine pigment includes a crystal particle having a crystal form that exhibits peaks at 7.4°±0.3° and 28.2°±0.3° at Bragg angles 2θ in a spectrum of X-ray diffraction using a CuKα, ray; and in a size distribution of the crystal particles, which is measured using small-angle X-ray scattering, a peak exists in a range of 20 to 50 nm, and the peak has a half-value width of 50 nm or smaller.

Furthermore, it is more preferable that the hydroxygallium phthalocyanine pigment has the crystal particle which contains an amide compound represented by the following formula (A1) in the particle. Examples of the amide compound represented by the formula (A1) include N-methylformamide, N-propylformamide and N-vinylformamide.

(A1)

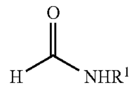

wherein $R^1$ represents a methyl group, a propyl group or a vinyl group.

In addition, a content of the amide compound represented by the formula (A1), which is contained in the crystal particle, is preferably 0.1 to 3.0% by mass, and is more preferably 0.1 to 1.4% by mass, with respect to the content of the crystal particle. Due to the content of the amide compound being 0.1 to 3.0% by mass, the size of the crystal particles can be aligned in an appropriate size. The hydroxygallium phthalocyanine pigment containing the amide compound represented by the formula (A1) in the crystal particle can be obtained by a process of modifying the crystals by subjecting a hydroxygallium phthalocyanine pigment obtained by an acid-pasting method and the amide compound represented by the above formula (A1) to wet milling treatment.

When a dispersant is used in the milling treatment, the amount of the dispersant is preferably 10 to 50 times the amount of the hydroxygallium phthalocyanine pigment on a mass basis. In addition, examples of solvents to be used include: amide-based solvents such as N,N-dimethylformamide, N,N-dimethylacetamide, compounds represented by the above formula (A1), N-methylacetamide and N-methylpropionamide; halogen-based solvents such as chloroform; ether-based solvents such as tetrahydrofuran; and sulfoxide-based solvents such as dimethylsulfoxide. In addition, the amount of the solvent to be used is preferably 5 to 30 times the amount of the hydroxygallium phthalocyanine pigment on a mass basis.

The inventors have also found that in a case where the crystal type of hydroxygallium phthalocyanine pigment to be used in the present disclosure is obtained by the crystal modification process, the time required for the modification of the crystal type becomes longer when an amide compound represented by the above formula (A1) is used as the solvent. Specifically, when N-methylformamide is used as the solvent, the time required for the crystal modification increases several times as compared with the case where N,N-dimethylformamide is used. Due to the crystal modification taking a long time, there is a time margin for making the size of the crystal particles small to some extent until the modification of the crystal form is completed, and the hydroxygallium phthalocyanine pigment of the present disclosure becomes easily obtained.

Whether or not the hydroxygallium phthalocyanine pigment of the present disclosure contains the amide compound represented by the above formula (A1) in the crystal particle has been determined by an analysis of data obtained by measuring the obtained hydroxygallium phthalocyanine pigment with 1H-NMR. In addition, a content of the amide compound represented by the above formula (A1) in the crystal particle has been determined by data analysis of the results of 1H-NMR measurement.

For example, in a case where, the milling treatment is performed with a solvent which can solve the amide compound represented by the above formula (A1), or a cleaning process is performed after the milling treatment, the obtained hydroxygallium phthalocyanine pigment is subjected to the 1H-NMR measurement. In a case where a peak derived from the amide compound represented by the above formula (A1) is detected in the data of the 1H-NMR measurement, it can be determined that the amide compound represented by the above formula (A1) is contained in the crystal.

In a case where the hydroxygallium phthalocyanine pigment of the present disclosure is obtained by a centrifugal separation treatment, a weight ratio of the hydroxygallium phthalocyanine pigment to the binder resin must be measured in a mixture liquid of the hydroxygallium phthalocyanine pigment and the binder resin, in order to control a ratio P of a volume of the charge generation material to the total volume of the charge generation layer. The weight ratio of the hydroxygallium phthalocyanine pigment to the binder resin in the mixture liquid has been determined by analysis of data of 1H-NMR measurement. For example, in a case where the hydroxygallium phthalocyanine pigment is used as the phthalocyanine pigment, and polyvinyl butyral is used as the binder resin, the weight ratio of the hydroxygallium phthalocyanine pigment to the binder resin can be determined by comparison between a peak derived from the hydroxygallium phthalocyanine pigment and a peak derived from the polyvinyl butyral in the data of the 1H-NMR measurement.

The hydroxygallium phthalocyanine pigment contained in the electrophotographic photosensitive member of the present disclosure has been subjected to powder X-ray diffraction measurement and 1H-NMR measurement employing the following conditions.

(Powder X-Ray Diffraction Measurement)

Measuring machine used: X-ray diffraction apparatus RINT-TTR II manufactured by Rigaku Corporation.

X-ray tube: Cu

X-ray wavelength: Kα1

Tube voltage: 50 KV

Tube current: 300 mA

Scanning method: 2θ scan

Scanning speed: 4.0°/min

Sampling interval: 0.020

Start angle (2θ): 5.0°

Stop angle (2θ): 35.0°

Goniometer: rotor horizontal goniometer (TTR-2)

Attachment: capillary rotary sample stage

Filter: none

Detector: scintillation counter

Incident monochromator: used

Slit: variable slit (parallel beam method)

Counter monochromator: not used

Divergence slit: open

Divergence vertical limiting slit: 10.00 mm

Scattering slit: open

Light receiving slit: open (1H-NMR measurement)

Measuring instrument used: AVANCE III 500 manufactured by BRUKER

Solvent: bisulfuric acid (D2SO4)

Number of integration times: 2,000

<Charge Transport Layer>

It is preferable that the charge transport layer contains a charge transport material and a resin.

Examples of the charge transport material include a polycyclic aromatic compound, a heterocyclic compound, a hydrazone compound, a styryl compound, an enamine compound, a benzidine compound, a triarylamine compound, and resins having a group derived from these materials. Among the materials, the triarylamine compound and the benzidine compound are preferable.

A content of the charge transport material in the charge transport layer is preferably 25 to 70% by mass, and is more preferably 30 to 55% by mass, with respect to the total mass of the charge transport layer.

Examples of the resin include a polyester resin, a polycarbonate resin, an acrylic resin and a polystyrene resin. Among the resins, the polycarbonate resin and the polyester resin are preferable. As the polyester resins, a polyarylate resin is particularly preferable.

A content ratio (mass ratio) between the charge transport material and the resin is preferably 4:10 to 20:10, and is more preferably 5:10 to 12:10.

In addition, the charge transport layer may contain additives such as an antioxidizing agent, an ultraviolet absorbing agent, a plasticizing agent, a leveling agent, a slipperiness imparting agent, and an abrasion resistance improver. The specific additives include a hindered phenol compound, a hindered amine compound, a sulfur compound, a phosphorus compound, a benzophenone compound, a siloxane modified resin, silicone oil, a fluorocarbon resin particle, a polystyrene resin particle, a polyethylene resin particle, a silica particle, an alumina particle and a boron nitride particle.

It is preferable for an average film thickness of the charge transport layer to be 5 to 50 μm, is more preferable to be 8 to 40 μm, and is particularly preferable to be 10 to 30 μm.

The charge transport layer can be formed by preparing a coating liquid for the charge transport layer, which contains each of the above materials and a solvent, forming a coating film of the coating liquid on the charge generation layer, and drying the coating film. Examples of the solvent to be used for the coating liquid include an alcohol-based solvent, a ketone-based solvent, an ether-based solvent, an ester-based solvent and an aromatic hydrocarbon-based solvent. Among the solvents, the ether-based solvent or the aromatic hydrocarbon-based solvent is preferable.

<Protective Layer>

In the present disclosure, a protective layer may also be provided on the photosensitive layer. By having the protective layer provided therein, the electrophotographic photosensitive member can improve its durability.

It is preferable that the protective layer contains an electroconductive particle and/or a charge transport material, and a resin.

Examples of the electroconductive particle include particles of metal oxides such as titanium oxide, zinc oxide, tin oxide and indium oxide.

Examples of the charge transport material include a polycyclic aromatic compound, a heterocyclic compound, a hydrazone compound, a styryl compound, an enamine compound, a benzidine compound, a triarylamine compound, and resins having a group derived from these materials. Among the materials, the triarylamine compound and the benzidine compound are preferable.

Examples of the resin include a polyester resin, an acrylic resin, a phenoxy resin, a polycarbonate resin, a polystyrene resin, a phenol resin, a melamine resin and an epoxy resin.

Among the resins, the polycarbonate resin, the polyester resin and the acrylic resin are preferable.

In addition, the protective layer may also be formed as a cured film, by the polymerization of a composition which contains a monomer having a polymerizable functional group. Examples of a reaction at this time include a thermal polymerization reaction, a photopolymerization reaction, and a radiation-induced polymerization reaction. Examples of the polymerizable functional group which the monomer having a polymerizable functional group has include an acryloyl group and a methacryloyl group. As a monomer having the polymerizable functional group, a material having charge transport capability may be used.

The protective layer may contain additives such as an antioxidizing agent, an ultraviolet absorbing agent, a plasticizing agent, a leveling agent, a slipperiness imparting agent and an abrasion resistance improver. The specific additives include a hindered phenol compound, a hindered amine compound, a sulfur compound, a phosphorus compound, a benzophenone compound, a siloxane modified resin, silicone oil, a fluorocarbon resin particle, a polystyrene resin particle, a polyethylene resin particle, a silica particle, an alumina particle and a boron nitride particle.

It is preferable for an average film thickness of the protective layer to be 0.5 to 10 μm, and is more preferable to be 1 to 7 μm.

The protective layer can be formed by preparing a coating liquid for the protective layer which contains each of the above materials and a solvent, forming a coating film of the coating liquid on the photosensitive layer, and drying and/or curing the coating film. Examples of the solvent to be used for the coating liquid include an alcohol-based solvent, a ketone-based solvent, an ether-based solvent, a sulfoxide-based solvent, an ester-based solvent and an aromatic hydrocarbon-based solvent.

[Process Cartridge and Electrophotographic Apparatus]

Figure 3:
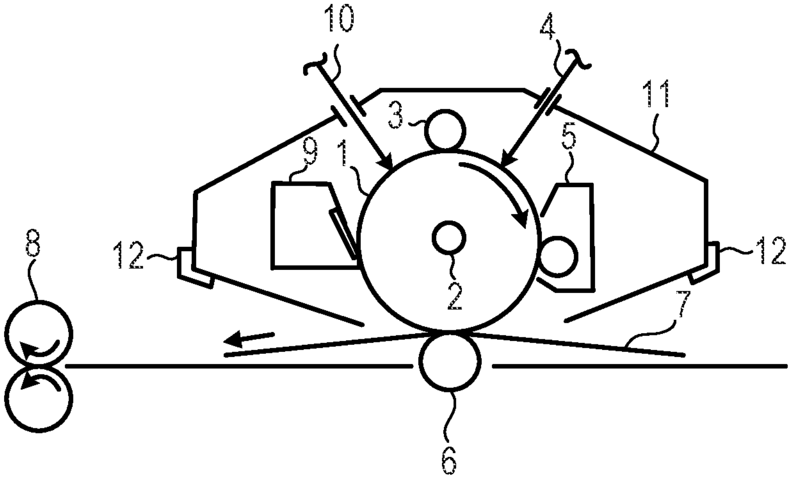
FIG. 3 illustrates a view illustrating one example of a schematic configuration of an electrophotographic apparatus provided with a process cartridge having the electrophotographic photosensitive member according to the present disclosure.

FIG. 3 illustrates one example of a schematic configuration of an electrophotographic apparatus that has a process cartridge provided with the electrophotographic photosensitive member. In FIG. 3, reference numeral 1 denotes a cylindrical (drum-shaped) electrophotographic photosensitive member which is rotationally driven around a shaft 2 in the direction of the arrow at a predetermined circumferential velocity (process speed).

The surface of the electrophotographic photosensitive member 1 is electrically charged to a predetermined positive or negative potential by a charging unit 3, in a rotation process. Next, the surface of the electrically charged electrophotographic photosensitive member 1 is irradiated with exposure light 4 emitted from an exposure unit (not illustrated), and an electrostatic latent image corresponding to objective image information is formed on the surface. The image exposure light 4 is light that is output, for example, from the exposure unit such as a slit exposure unit or a laser beam scanning exposure unit, and is intensity-modulated corresponding to time-series electric digital image signals of objective image information.

The electrostatic latent image formed on the surface of the electrophotographic photosensitive member 1 is developed (normally developed or reversely developed) by a toner accommodated in a developing unit 5, and a toner image is formed on the surface of the electrophotographic photosensitive member 1. The toner image formed on the surface of the electrophotographic photosensitive member 1 is transferred onto a transfer material 7 by a transfer unit 6. At this time, a bias voltage having a polarity opposite to that of a charge held by the toner is applied to the transfer unit 6 from a bias power supply (not illustrated). In addition, when the transfer material 7 is paper, the transfer material 7 is taken out from a paper feeding unit (not illustrated), and is fed to a gap between the electrophotographic photosensitive member 1 and the transfer unit 6 in synchronization with the rotation of the electrophotographic photosensitive member 1.

The transfer material 7 onto which the toner image has been transferred from the electrophotographic photosensitive member 1 is separated from the surface of the electrophotographic photosensitive member 1, is conveyed to a fixing unit 8, is subjected to a fixing process of the toner image, and is then printed out to the outside of the electrophotographic apparatus, as an image formed product (print or copy). After the toner image has been transferred onto the transfer material 7, the surface of the electrophotographic photosensitive member 1 is subjected to the removal of deposits such as the toner (transfer residual toner) by a cleaning unit 9, and is cleaned. In a cleanerless system which has been developed in recent years, the transfer residual toner can also be directly removed by a developing device or the like. Furthermore, the surface of the electrophotographic photosensitive member 1 is subjected to charge elimination treatment by pre-exposure light 10 emitted from a pre-exposure unit (not illustrated), and then is repeatedly used for the image formation. For information, when the charging unit 3 is a contact charging unit using a charging roller or the like, the pre-exposure unit is not necessarily required. In the present disclosure, the process cartridge is formed by accommodating a plurality of components among components such as the above described electrophotographic photosensitive member 1, the charging unit 3, the developing unit 5 and the cleaning unit 9 in a vessel, and integrally supporting the components. The process cartridge can be configured to be detachably attachable to a main body of the electrophotographic apparatus. For example, the cartridge is structured by integrally supporting at least one selected from the group consisting of the charging unit 3, the developing unit 5 and the cleaning unit 9, together with the electrophotographic photosensitive member 1. A process cartridge 11 can be structured so as to be detachably attachable to the main body of the electrophotographic apparatus, by using a guide unit 12 such as a rail of the main body of the electrophotographic apparatus. When the electrophotographic apparatus is a copying machine or a printer, the exposure light 4 may be reflected light from or transmitted light through a document. Alternatively, the exposure light 4 may be light emitted by a device which reads a document with a sensor, generates a signal, generates a scanning laser beam according to the signal, or drives an LED array or a liquid crystal shutter array.

The electrophotographic photosensitive member 1 of the present disclosure can be widely applied to electrophotographic application fields such as laser beam printers, CRT printers, LED printers, FAX machines, liquid crystal printers, laser plate making and the like.

EXAMPLES

The present disclosure will be described below in more detail with reference to Examples and Comparative Examples. The present disclosure is not limited to the following Examples at all, as long as the present disclosure does not exceed the gist thereof. For information, the term "part(s)" in the description of the following Examples is on a mass basis, unless otherwise particularly noted.

A film thickness of each layer of the electrophotographic photosensitive members of Examples and Comparative Examples was determined by a method using an eddy current film thickness meter (Fischerscope, manufactured by Fischer Instruments K.K.), or a method of conversion through a specific gravity from the mass per unit area, except for the charge generation layer. The film thickness of the charge generation layer was measured by converting a Macbeth density value of the photosensitive member, using a calibration curve that was obtained in advance from the Macbeth density value which was measured by pressing a spectral densitometer (trade name: X-Rite 504/508, manufactured by X-Rite Inc.) against the surface of the photosensitive member, and from a film thickness measurement value obtained by cross-sectional SEM image observation.

Preparation Example of Coating Liquid 1 for Undercoat Layer

One hundred parts of rutile-type titanium dioxide fine particles (average primary particle size: 50 nm, produced by Tayca Corporation) were mixed with 500 parts of toluene under stirring, 3.0 parts of methyldimethoxysilane ("TSL 8117" produced by Toshiba Silicone Co., Ltd.) were added thereto, and the mixture was stirred for 8 hours. After that, the toluene was distilled off under reduced pressure, the resultant product was dried at 120° C. for 3 hours, and thereby a rutile-type titanium dioxide fine particle was obtained which was already surface-treated with methyldimethoxysilane.

Eighteen parts of the rutile-type titanium dioxide fine particles which were surface-treated with the methyldimethoxysilane, 4.5 parts of N-methoxymethylated nylon (trade name: Toresin EF-30T, produced by Nagase ChemteX Corporation), and 1.5 parts of a copolymerized nylon resin (trade name: Amilan CM8000, produced by Toray Industries, Inc.) were added to a mixed solvent of 90 parts of methanol and 60 parts of 1-butanol, and a dispersion liquid was prepared. This dispersion liquid was subjected to dispersion treatment in a vertical sand mill using glass beads having a diameter of 1.0 mm, for 6 hours. The liquid which was thus subjected to the sand mill dispersion treatment was further subjected to dispersion treatment with an ultrasonic disperser (UT-205, manufactured by Sharp Corporation) for 1 hour, and thereby a coating liquid 1 for an undercoat layer was prepared. The output of the ultrasonic disperser was set to 100%. In addition, media such as the glass beads were not used in this milling treatment.

Preparation Example of Coating Liquid 2 for Undercoat Layer

A coating liquid 2 for the undercoat layer was prepared in the same way as the coating liquid 1 for the undercoat layer, except that the sand mill dispersion processing time was changed to 4 hours, in the Preparation Example of the coating liquid 1 for the undercoat layer.

Preparation Example of Coating Liquid 3 for Undercoat Layer

One hundred parts of rutile-type titanium dioxide fine particles (average primary particle size: 15 nm, produced by Tayca Corporation) were mixed with 500 parts of toluene under stirring, 9.6 parts of methyldimethoxysilane ("TSL 8117" produced by Toshiba Silicone Co., Ltd.) were added thereto, and the mixture was stirred for 8 hours. After that, the toluene was distilled off under reduced pressure, the resultant product was dried at 120° C. for 3 hours, and thereby a rutile-type titanium dioxide fine particle was obtained which was already surface-treated with methyldimethoxysilane.

Six parts of the rutile-type titanium dioxide fine particles which were surface-treated with the methyldimethoxysilane, 4.5 parts of the N-methoxymethylated nylon (trade name: Toresin EF-30T, produced by Nagase ChemteX Corporation), and 1.5 parts of the copolymerized nylon resin (trade name: Amilan CM8000, produced by Toray Industries, Inc.) were added to a mixed solvent of 90 parts of methanol and 60 parts of 1-butanol, and a dispersion liquid was prepared. This dispersion liquid was subjected to dispersion treatment in a vertical sand mill using glass beads having a diameter of 1.0 mm, for 6 hours. The liquid which was thus subjected to the sand mill dispersion treatment was further subjected to dispersion treatment with the ultrasonic disperser (UT-205, manufactured by Sharp Corporation) for 1 hour, and thereby a coating liquid 3 for the undercoat layer was prepared. The output of the ultrasonic disperser was set to 100%. In addition, media such as the glass beads were not used in this milling treatment.

Preparation Example of Coating Liquid 4 for Undercoat Layer

A coating liquid 4 for the undercoat layer was prepared in the same way as the coating liquid 3 for the undercoat layer, except that the sand mill dispersion processing time was changed to 4 hours, in the Preparation Example of the coating liquid 3 for the undercoat layer.

Preparation Example of Coating Liquid 5 for Undercoat Layer

One hundred parts of rutile-type titanium dioxide fine particles (average primary particle size: 35 nm, produced by Tayca Corporation) were mixed with 500 parts of toluene under stirring, 4.32 parts of methyldimethoxysilane ("TSL 8117" produced by Toshiba Silicone Co., Ltd.) were added thereto, and the mixture was stirred for 8 hours. After that, the toluene was distilled off under reduced pressure, the resultant product was dried at 120° C. for 3 hours, and thereby a rutile-type titanium dioxide fine particle was obtained which was already surface-treated with methyldimethoxysilane.

Twelve parts of the rutile-type titanium dioxide fine particles which were surface-treated with the methyldimethoxysilane, 4.5 parts of the N-methoxymethylated nylon (trade name: Toresin EF-30T, produced by Nagase ChemteX Corporation), and 1.5 parts of the copolymerized nylon resin (trade name: Amilan CM8000, produced by Toray Industries, Inc.) were added to a mixed solvent of 90 parts of methanol and 60 parts of 1-butanol, and a dispersion liquid was prepared. This dispersion liquid was subjected to dispersion treatment in a vertical sand mill using glass beads having a diameter of 1.0 mm, for 6 hours. The liquid which was thus subjected to the sand mill dispersion treatment was further subjected to dispersion treatment with the ultrasonic disperser (UT-205, manufactured by Sharp Corporation) for 1 hour, and thereby a coating liquid 5 for the undercoat layer was prepared. The output of the ultrasonic disperser was set to 100%. In addition, media such as the glass beads were not used in this milling treatment.

Preparation Example of Coating Liquid 6 for Undercoat Layer

A coating liquid 6 for the undercoat layer was prepared in the same way as the coating liquid 5 for the undercoat layer, except that the sand mill dispersion processing time was changed to 4 hours, in the Preparation Example of the coating liquid 5 for the undercoat layer.

Preparation Example of Coating Liquid 7 for Undercoat Layer

One hundred parts of rutile-type titanium dioxide fine particles (average primary particle size: 80 nm, produced by Tayca Corporation) were mixed with 500 parts of toluene under stirring, 1.8 parts of methyldimethoxysilane ("TSL 8117" produced by Toshiba Silicone Co., Ltd.) were added thereto, and the mixture was stirred for 8 hours. After that, the toluene was distilled off under reduced pressure, the resultant product was dried at 120° C. for 3 hours, and thereby a rutile-type titanium dioxide fine particle was obtained which was already surface-treated with methyldimethoxysilane.

Eighteen parts of the rutile-type titanium dioxide fine particles which were surface-treated with the methyldimethoxysilane, 4.5 parts of N-methoxymethylated nylon (trade name: Toresin EF-30T, produced by Nagase ChemteX Corporation), and 1.5 parts of the copolymerized nylon resin (trade name: Amilan CM8000, produced by Toray Industries, Inc.) were added to a mixed solvent of 90 parts of methanol and 60 parts of 1-butanol, and a dispersion liquid was prepared. This dispersion liquid was subjected to dispersion treatment in a vertical sand mill using glass beads having a diameter of 1.0 mm, for 6 hours. The liquid which was thus subjected to the sand mill dispersion treatment was further subjected to dispersion treatment with the ultrasonic disperser (UT-205, manufactured by Sharp Corporation) for 1 hour, and thereby a coating liquid 7 for the undercoat layer was prepared. The output of the ultrasonic disperser was set to 100%. In addition, media such as the glass beads were not used in this milling treatment.

Preparation Example of Coating Liquid 8 for Undercoat Layer

A coating liquid 8 for the undercoat layer was prepared in the same way as the coating liquid 7 for the undercoat layer, except that the sand mill dispersion processing time was changed to 4 hours, in the Preparation Example of the coating liquid 7 for the undercoat layer.

Preparation Example of Coating Liquid 9 for Undercoat Layer

One hundred parts of rutile-type titanium dioxide fine particles (average primary particle size: 120 nm, produced by Tayca Corporation) were mixed with 500 parts of toluene under stirring, 1.8 parts of methyldimethoxysilane ("TSL 8117" produced by Toshiba Silicone Co., Ltd.) were added thereto, and the mixture was stirred for 8 hours. After that, the toluene was distilled off under reduced pressure, the resultant product was dried at 120° C. for 3 hours, and thereby a rutile-type titanium dioxide fine particle was obtained which was already surface-treated with methyldimethoxysilane.

Eighteen parts of the rutile-type titanium dioxide fine particles which were surface-treated with the methyldimethoxysilane, 4.5 parts of N-methoxymethylated nylon (trade name: Toresin EF-30T, produced by Nagase ChemteX Corporation), and 1.5 parts of the copolymerized nylon resin (trade name: Amilan CM8000, produced by Toray Industries, Inc.) were added to a mixed solvent of 90 parts of methanol and 60 parts of 1-butanol, and a dispersion liquid was prepared. This dispersion liquid was subjected to dispersion treatment in a vertical sand mill using glass beads having a diameter of 1.0 mm, for 6 hours. The liquid which was thus subjected to the sand mill dispersion treatment was further subjected to dispersion treatment with the ultrasonic disperser (UT-205, manufactured by Sharp Corporation) for 1 hour, and thereby a coating liquid 9 for the undercoat layer was prepared. The output of the ultrasonic disperser was set to 100%. In addition, media such as the glass beads were not used in this milling treatment.

Preparation Example of Coating Liquid 10 for Undercoat Layer

A coating liquid 10 for the undercoat layer was prepared in the same way as the coating liquid 1 for the undercoat layer, except that methyldimethoxysilane was changed to vinyltrimethoxysilane (trade name: KBM-1003, produced by Shin-Etsu Chemical Co., Ltd.), in the Preparation Example of the coating liquid 1 for the undercoat layer.

Preparation Example of Coating Liquid 11 for Undercoat Layer

A coating liquid 11 for the undercoat layer was prepared in the same way as the coating liquid 10 for the undercoat layer, except that the sand mill dispersion processing time was changed to 4 hours, in the Preparation Example of the coating liquid 10 for the undercoat layer.

Preparation Example of Coating Liquid 12 for Undercoat Layer

Eighteen parts of the rutile-type titanium dioxide fine particles (average primary particle size: 50 nm, produced by Tayca Corporation), 4.5 parts of N-methoxymethylated nylon (trade name: Toresin EF-30T, produced by Nagase ChemteX Corporation), and 1.5 parts of the copolymerized nylon resin (trade name: Amilan CM8000, produced by Toray Industries, Inc.) were added to a mixed solvent of 90 parts of methanol and 60 parts of 1-butanol, and a dispersion liquid was prepared. This dispersion liquid was subjected to dispersion treatment in a vertical sand mill using glass beads having a diameter of 1.0 mm, for 6 hours. The liquid which was thus subjected to the sand mill dispersion treatment was further subjected to dispersion treatment with the ultrasonic disperser (UT-205, manufactured by Sharp Corporation) for 1 hour, and thereby a coating liquid 12 for an undercoat layer was prepared. The output of the ultrasonic disperser was set to 100%. In addition, media such as the glass beads were not used in this milling treatment.

Preparation Example of Coating Liquid 13 for Undercoat Layer

A coating liquid 13 for the undercoat layer was prepared in the same way as the coating liquid 3 for the undercoat layer, except that the ultrasonic dispersion was not performed in the Preparation Example of the coating liquid 3 for the undercoat layer.

Preparation Example of Coating Liquid 14 for Undercoat Layer

A coating liquid 14 for the undercoat layer was prepared in the same way as the coating liquid 3 for the undercoat layer, except that the sand mill dispersion processing time was changed to 15 hours, in the Preparation Example of the coating liquid 3 for the undercoat layer.

Preparation Example of Coating Liquid 15 for Undercoat Layer

A coating liquid 15 for the undercoat layer was prepared in the same way as the coating liquid 5 for the undercoat layer, except that the ultrasonic dispersion was not performed in the Preparation Example of the coating liquid 5 for the undercoat layer.

Preparation Example of Coating Liquid 16 for Undercoat Layer

A coating liquid 16 for the undercoat layer was prepared in the same way as the coating liquid 7 for the undercoat layer, except that the ultrasonic dispersion was not performed in the Preparation Example of the coating liquid 7 for the undercoat layer.

Preparation Example of Coating Liquid 17 for Undercoat Layer

A coating liquid 17 for the undercoat layer was prepared in the same way as the coating liquid 7 for the undercoat layer, except that the sand mill dispersion processing time was changed to 15 hours, in the Preparation Example of the coating liquid 7 for the undercoat layer.

[Synthesis of Phthalocyanine Pigment]

Synthesis Example 1

Under an atmosphere of nitrogen flow, 5.46 parts of orthophthalonitrile and 45 parts of α-chloronaphthalene were charged into a reaction vessel, and then were heated to raise the temperature to 30° C.; and this temperature was maintained. Next, 3.75 parts of gallium trichloride were charged there at this temperature (30° C.). The water concentration of the mixed liquid at the time of the charging was 150 ppm. After that, the temperature was raised to 200° C. Next, the mixed liquid was subjected to a reaction at a temperature of 200° C. for 4.5 hours under an atmosphere of nitrogen flow, and then was cooled, and when the temperature reached 150° C., the product was filtered. The obtained residue was dispersed and cleaned using N,N-dimethylformamide, at a temperature of 140° C. for 2 hours, and then was filtered. The obtained residue was cleaned with methanol, and then was dried; and a chlorogallium phthalocyanine pigment was obtained at a yield of 71%.

Synthesis Example 2

The chlorogallium phthalocyanine pigment in an amount of 4.65 parts, which was obtained in the Synthesis Example 1, was dissolved in 139.5 parts of concentrated sulfuric acid at a temperature of 10° C.; the mixture was added dropwise to 620 parts of ice water under stirring; the pigment was reprecipitated; and the mixture was filtered under reduced pressure using a filter press. At this time, No. 5C (manufactured by Advantec Ltd.) was used as a filter. The obtained wet cake (residue) was dispersed and cleaned with 2% aqueous ammonia for 30 minutes, and then the mixture was filtered using a filter press. Next, the obtained wet cake (residue) was dispersed and cleaned with ion-exchanged water, and then filtration using a filter press was repeated 3 times. In the end, the residue was subjected to freeze-drying (freeze-drying), and a hydroxygallium phthalocyanine pigment (hydrous hydroxygallium phthalocyanine pigment) having a solid content of 23% was obtained at a yield of 97%.

Synthesis Example 3

The hydrous hydroxygallium phthalocyanine pigment in an amount of 6.6 kg, which was obtained in the Synthesis Example 2, was dried in the following way, using a hyper dry drying machine (trade name: HD-06R, frequency (oscillation frequency): 2455 MHz±15 MHz, manufactured by Biocon (Japan) Ltd.).

The above hydroxygallium phthalocyanine pigment was placed on a dedicated circular plastic tray, in a state of a lump (water-containing cake thickness of 4 cm or smaller) immediately after having been taken out from the filter press; and far infrared rays were turned off, and the temperature of the inner wall of the drying machine was set so as to become 50° C. Then, at the time of microwave irradiation, the vacuum pump and the leak valve were adjusted so that the vacuum degree became 4.0 to 10.0 kPa.

Firstly, in a first step, the hydroxygallium phthalocyanine pigment was irradiated with a microwave of 4.8 kW for 50 minutes; subsequently, the microwave was once turned off, and the leak valve was once closed; and the drying machine was adjusted to become a high vacuum of 2 kPa or lower. The solid content of the hydroxygallium phthalocyanine pigment was 88% at this point in time. In a second step, the leak valve was adjusted, and the degree of vacuum (pressure in the drying machine) was adjusted to within the above set value (4.0 to 10.0 kPa). After that, the hydroxygallium phthalocyanine pigment was irradiated with the microwave of 1.2 kW for 5 minutes; the microwave was once turned off, and the leak valve was once closed; and the drying machine was adjusted to become a high vacuum of 2 kPa or lower. This second step was further repeated one more time (two times in total). The solid content of the hydroxygallium phthalocyanine pigment was 98% at this point in time. Furthermore, in a third step, the pigment was irradiated with microwave in the same manner as in the second step, except that the microwave output in the second step was changed from 1.2 to 0.8 kW. This third step was further repeated one more time (two times in total). Furthermore, in a fourth step, the leak valve was adjusted, and the vacuum degree (pressure in the drying machine) was restored to within the above set value (4.0 to 10.0 kPa). After that, the hydroxygallium phthalocyanine pigment was irradiated with the microwave of 0.4 kW for 3 minutes; the microwave was once turned off, and the leak valve was once closed; and the drying machine was adjusted to become a high vacuum of 2 kPa or lower. This fourth step was further repeated seven times (eight times in total). Thus, in a total of 3 hours, 1.52 kg of a hydroxygallium phthalocyanine pigment (crystal) was obtained of which the water content was 1% or less.

Synthesis Example 4

Under an atmosphere of nitrogen flow, 10 g of gallium trichloride and 29.1 g of orthophthalonitrile were added to 100 mL of α-chloronaphthalene, the mixture was reacted at a temperature of 200° C. for 24 hours, and the product was filtered. The obtained wet cake was heated and stirred in N, N-dimethylformamide at a temperature of 150° C. for 30 minutes, and then filtered. The obtained residue was cleaned with methanol, and then was dried; and a chlorogallium phthalocyanine pigment was obtained at a yield of 83%.

In 50 parts of concentrated sulfuric acid, 2 parts of the chlorogallium phthalocyanine pigment were dissolved which was obtained by the above method; the solution was stirred for 2 hours, and then was added dropwise into an ice-cooled mixed solution of 170 mL of distilled water and 66 mL of concentrated ammonia water; and chlorogallium phthalocyanine was reprecipitated. The reprecipitate was sufficiently washed with distilled water and dried; and 1.8 parts of hydroxygallium phthalocyanine pigment were obtained.

Preparation Example of Coating Liquid 1 for Charge Generation Layer

A mixture of 1 part of the hydroxygallium phthalocyanine pigment obtained in Synthesis Example 3, 9 parts of N-methylformamide (product code: F0059, produced by Tokyo Chemical Industry Co., Ltd.), and 15 parts of glass beads having a diameter of 0.9 mm were subjected to a milling process under cooling water at a temperature of 18° C. for 70 hours using a sand mill (K-800, manufactured by Igarashi Machine Manufacture Co., Ltd. (IMEX Co., Ltd., at present), disk size of 70 mm, and number of disks of 5). At this time, the milling treatment was performed under the condition that the disk rotated 400 times per minute. To thus treated liquid, 30 parts of N-methylformamide were added, then the mixture was filtered, and then, the filtration residue on the filter was sufficiently cleaned with tetrahydrofuran. Then, the cleaned filtration residue was vacuum-dried, and 0.45 parts of a hydroxygallium phthalocyanine pigment was obtained.

The obtained pigment has peaks at 7.5°±0.2°, 9.9° 0.2°, 16.2° 0.2°, 18.6° 0.2°, 25.2°±0.2°, and 28.3°±0.2° at Bragg angles 2θ in a spectrum (FIG. 1) of X-ray diffraction using a CuKα, ray. In addition, the content of the amide compound (N-methylformamide) represented by the above formula (A1) in the hydroxygallium phthalocyanine crystal particle, which was estimated by 1H-NMR measurement, was 1.5% by mass with respect to the content of the hydroxygallium phthalocyanine.

Subsequently, 25 parts of the hydroxygallium phthalocyanine pigment obtained by the milling treatment, 5 parts of polyvinyl butyral (trade name: S-LEC BX-1, produced by Sekisui Chemical Co., Ltd.) and 190 parts of cyclohexane were charged into a vessel for centrifugal separation, and were subjected to centrifugal separation treatment at a preset temperature of 18° C. for 30 minutes, using a high-speed cooling centrifuge (trade name: himac CR22G, manufactured by Koki Holdings Co., Ltd.). At this time, R14A (trade name, manufactured by Koki Holdings Co., Ltd.) was used as a rotor, and acceleration and deceleration were performed under the conditions of 1,800 rotations per minute in the shortest time. The supernatant after the centrifugation was immediately collected into another container for centrifugation. The solution thus obtained was subjected to centrifugal separation treatment again in the same manner as described above except that the condition was set to 8,000 rotations per minute, the supernatant after centrifugation was removed, and the remaining solution was immediately collected into another sample bottle. A weight ratio of the hydroxygallium phthalocyanine pigment to polyvinyl butyral in the solution thus obtained was determined by 1H-NMR measurement. In addition, a solid content of the obtained solution was determined by a method of drying the solid content for 30 minutes with a drying machine set at 150° C., and measuring the difference in weight before and after the drying.

Subsequently, to the solution obtained by the centrifugal separation treatment, polyvinyl butyral (trade name: S-LEC BX-1, produced by Sekisui Chemical Co., Ltd.) and cyclohexanone were added so that the weight ratio of the hydroxygallium phthalocyanine pigment, polyvinyl butyral, and cyclohexanone was 20:10:190. Using the sand mill (K-800, manufactured by Igarashi Machine Manufacture Co., Ltd. (IMEX Co., Ltd., at present), disk size of 70 mm, and number of disks of 5), 220 parts of this solution and 482 parts of glass beads having a diameter of 0.9 mm were subjected to dispersion treatment in cooling water at a temperature of 18° C. for 4 hours. At this time, the dispersion treatment was performed under the condition that the disk rotated at 1,800 rotations per minute. A coating liquid 1 for a charge generation layer was prepared by adding 444 parts of cyclohexane and 634 parts of ethyl acetate to the dispersion liquid.

The measurement by small-angle X-ray scattering of the hydroxygallium phthalocyanine pigment in the present disclosure was evaluated according to the following procedure.

Cyclohexane was added to the prepared coating liquid 1 for the charge generation layer, and diluted the coating liquid 1 until the concentration of the charge generation material became 1 wt. %: and a measurement sample was prepared.

The small-angle X-ray scattering of the sample was measured (wave length of X-ray; 0.154 nm) using a multi-purpose X-ray diffraction apparatus SmartLab manufactured by Rigaku Corporation, and a scattering profile was obtained.

The scattering profile obtained by the measurement was analyzed using particle size analysis software NANO-Solver, and a particle size distribution was obtained. For information, the particle shape was assumed to be a sphere.

As a result of the measurement, as shown in Table 1, a peak in the size distribution of crystallites of the obtained pigment, which was measured using the small-angle X-ray scattering, existed at a position of 32 nm, and the half-value width of the peak was 38 nm.

Preparation Example of Coating Liquid 2 for Charge Generation Layer

A coating liquid 2 for the charge generation layer was prepared in the same way as the coating liquid 1 for the charge generation layer, except that the milling processing time by a sand mill was changed from 70 hours to 10 hours, in the Preparation Example of the coating liquid 1 for the charge generation layer.

The obtained pigment before the centrifugal separation treatment has peaks at 7.5°±0.2°, 9.9°±0.2°, 16.2° 0.2°, 18.6° 0.2°, 25.2°±0.2°, and 28.3°±0.2° at Bragg angles 2θ in a spectrum of X-ray diffraction using a CuKα, ray. In addition, the content of the amide compound (N-methylformamide) represented by the above formula (A1) in the hydroxygallium phthalocyanine crystal particle, which was estimated by the $^{1}$H-NMR measurement, was 2.7% by mass with respect to the content of the hydroxygallium phthalocyanine.

In addition, as shown in Table 1, a peak in the size distribution of crystallites of the obtained pigment, which was measured using the small-angle X-ray scattering, existed at a position of 45 nm, and the half-value width of the peak was 44 nm.

Preparation Example of Coating Liquid 3 for Charge Generation Layer

A coating liquid 3 for the charge generation layer was prepared in the same way as the coating liquid 1 for the charge generation layer, except that the milling processing time by the sand mill was changed from 70 hours to 30 hours, in the Preparation Example of the coating liquid 1 for the charge generation layer.

The obtained pigment before the centrifugal separation treatment has peaks at 7.5°±0.2°, 9.9°±0.2°, 16.2° 0.2°, 18.6° 0.2°, 25.2°±0.2°, and 28.3°±0.2° at Bragg angles 2θ in a spectrum of X-ray diffraction using a CuKα, ray. In addition, the content of the amide compound (N-methylformamide) represented by the above formula (A1) in the hydroxygallium phthalocyanine crystal particle, which was estimated by the $^{1}$H-NMR measurement, was 2.0% by mass with respect to the content of the hydroxygallium phthalocyanine.

In addition, as shown in Table 1, a peak in the size distribution of crystallites of the obtained pigment, which was measured using the small-angle X-ray scattering, existed at a position of 38 nm, and the half-value width of the peak was 41 nm.

Preparation Example of Coating Liquid 4 for Charge Generation Layer

A coating liquid 4 for the charge generation layer was prepared in the same way as the coating liquid 1 for the charge generation layer, except that the milling processing time by the sand mill was changed from 70 hours to 100 hours, in the Preparation Example of the coating liquid 1 for the charge generation layer.

The obtained pigment before the centrifugal separation treatment has peaks at 7.5°±0.2°, 9.9°±0.2°, 16.2° 0.2°, 18.6° 0.2°, 25.2°±0.2°, and 28.3°±0.2° at Bragg angles 2θ in a spectrum X-ray diffraction using a CuKα, ray. In addition, the content of the amide compound (N-methylformamide) represented by the above formula (A1) in the hydroxygallium phthalocyanine crystal particle, which was estimated by the $^{1}$H-NMR measurement, was 1.0% by mass with respect to the content of the hydroxygallium phthalocyanine.

In addition, as shown in Table 1, a peak in the size distribution of crystallites of the obtained pigment, which was measured using the small-angle X-ray scattering, existed at a position of 30 nm, and the half-value width of the peak was 35 nm.

Preparation Example of Coating Liquid 5 for Charge Generation Layer

A coating liquid 5 for the charge generation layer was prepared in the same way as the coating liquid 1 for the charge generation layer, except that the hydroxygallium phthalocyanine pigment obtained by the milling treatment in the Preparation Example of the coating liquid 1 for the charge generation layer was changed in the following way.

A mixture of 1 part of the hydroxygallium phthalocyanine pigment obtained in Synthesis Example 3, 9 parts of N,N-dimethylformamide (product code: D0722, produced by Tokyo Chemical Industry Co., Ltd.), and 15 parts of glass beads having a diameter of 0.9 mm were subjected to a milling process under cooling water at a temperature of 18° C. for 30 hours using the sand mill (K-800, manufactured by Igarashi Machine Manufacture Co., Ltd. (IMEX Co., Ltd., at present), disk size of 70 mm, and number of disks of 5). At this time, the milling treatment was performed under the condition that the disk rotated 600 times per minute. The thus treated liquid was filtered through a filter (product number: N-NO. 125T, pore size: 133 μm, produced by NBC Meshtec Inc.), and glass beads were removed. To this liquid, 30 parts of N,N-dimethylformamide were added, then the mixture was filtered, and the filtration residue on the filter was sufficiently cleaned with tetrahydrofuran. Then, the cleaned filtration residue was vacuum-dried, and 0.45 parts of a hydroxygallium phthalocyanine pigment was obtained.

The obtained pigment before the centrifugal separation treatment has peaks at 7.5°±0.2°, 9.9°±0.2°, 16.2° 0.2°, 18.6° 0.2°, 25.2°±0.2°, and 28.3°±0.2° at Bragg angles 2θ in a spectrum of X-ray diffraction using a CuKα, ray.

In addition, as shown in Table 1, a peak in the size distribution of crystallites of the obtained pigment, which was measured using the small-angle X-ray scattering, existed at a position of 45 nm, and the half-value width of the peak was 47 nm.

Preparation Example of Coating Liquid 6 for Charge Generation Layer

A coating liquid 6 for the charge generation layer was prepared in the same way as the coating liquid 5 for the charge generation layer, except that the milling processing time by the sand mill was changed from 30 hours to 50 hours, in the Preparation Example of the coating liquid 5 for the charge generation layer.

The obtained pigment before the centrifugal separation treatment has peaks at 7.5°±0.2°, 9.9°±0.2°, 16.2° 0.2°, 18.6° 0.2°, 25.2°±0.2°, and 28.3°±0.2° at Bragg angles 2θ in a spectrum of X-ray diffraction using a CuKα, ray.

In addition, as shown in Table 1, a peak in the size distribution of crystallites of the obtained pigment, which was measured using the small-angle X-ray scattering, existed at a position of 41 nm, and the half-value width of the peak was 46 nm.

Preparation Example of Coating Liquid 7 for Charge Generation Layer

A coating liquid 7 for the charge generation layer was prepared in the same way as the coating liquid 2 for the charge generation layer, except that the centrifugal separation treatment was not performed, in the coating liquid 2 for the charge generation layer. In the obtained pigment, a content of the amide compound (N-methylformamide) represented by the above formula (A1) in the hydroxygallium phthalocyanine crystal particle, which was estimated by the $^{1}$H-NMR measurement, was 2.7% by mass with respect to the content of the hydroxygallium phthalocyanine.

In addition, as shown in Table 1, a peak in the size distribution of crystallites of the obtained pigment, which was measured using the small-angle X-ray scattering, existed at a position of 43 nm, and the half-value width of the peak was 55 nm.

Preparation Example of Coating Liquid 8 for Charge Generation Layer

A coating liquid 8 for the charge generation layer was prepared in the same way as the coating liquid 5 for the charge generation layer, except that the milling processing time by the sand mill was changed from 30 hours to 10 hours, in the Preparation Example of the coating liquid 5 for the charge generation layer.

The obtained pigment before the centrifugal separation treatment has peaks at 7.5°±0.2°, 9.9°±0.2°, 16.2° 0.2°, 18.6° 0.2°, 25.2°±0.2°, and 28.3°±0.2° at Bragg angles 2θ in a spectrum of X-ray diffraction using a CuKα ray.

In addition, as shown in Table 1, a peak in the size distribution of crystallites of the obtained pigment, which was measured using the small-angle X-ray scattering, existed at a position of 55 nm, and the half-value width of the peak was 48 nm.

Preparation Example of Coating Liquid 9 for Charge Generation Layer

A coating liquid 9 for the charge generation layer was prepared in the same way as the coating liquid 5 for the charge generation layer, except that the centrifugal separation treatment was not performed, in the coating liquid 5 for the charge generation layer.

As shown in Table 1, a peak in the size distribution of crystallites of the obtained pigment, which was measured using the small-angle X-ray scattering, existed at a position of 53 nm, and the half-value width of the peak was 60 nm.

Preparation Example of Coating Liquid 10 for Charge Generation Layer

A coating liquid 10 for the charge generation layer was prepared in the same way as the coating liquid 1 for the charge generation layer, except that a process of obtaining the hydroxygallium phthalocyanine pigment in the Preparation Example of the coating liquid 1 for the charge generation layer was changed in the following way. The hydroxygallium phthalocyanine pigment in an amount of 0.5 parts, which was obtained in Synthesis Example 4, 7.5 parts of N,N-dimethylformamide (product code: D0722, produced by Tokyo Chemical Industry Co., Ltd.), and 29 parts of glass beads having a diameter of 0.9 mm were subjected to milling treatment in a ball mill at a temperature of 25° C. for 24 hours. At this time, a standard bottle (product name: PS-6, manufactured by Hakuyo Glass Co., Ltd.) was used as the container, and the milling treatment was performed under the condition that the container rotated 60 times per 1 minute. The thus treated liquid was filtered through a filter (product number: N-NO. 125T, pore size: 133 μm, produced by NBC Meshtec Inc.), and glass beads were removed. To this liquid, 30 parts of N,N-dimethylformamide were added, then the mixture was filtered, and the filtration residue on the filter was sufficiently cleaned with n-butyl acetate. Then, the cleaned filtration residue was vacuum-dried, and 0.45 parts of a hydroxygallium phthalocyanine pigment was obtained.

As shown in Table 1, a peak in the size distribution of crystallites of the obtained pigment, which was measured using the small-angle X-ray scattering, existed at a position of 60 nm, and the half-value width of the peak was 59 nm.

Example 1

<Support>

An aluminum cylinder having a diameter of 30 mm, and a length of 260.5 mm was used as a support (cylindrical support).

<Electroconductive Layer>

As a base substance, anatase-type titanium oxide was used of which the average size of primary particles was 200 nm, and a titanium niobium sulfate solution was prepared which contained 33.7 parts of titanium in terms of $TiO_2$ and 2.9 parts of niobium in terms of $Nb_2O_5$. In pure water, 100 parts of the base substance were dispersed to prepare 1000 parts of a suspension liquid, and the suspension liquid was heated to 60° C. The titanium niobium sulfate solution and a 10 mol/L solution of sodium hydroxide were added dropwise to the suspension liquid over 3 hours so that the pH of the suspension liquid became 2 to 3. After the whole quantity was added dropwise, the pH was adjusted to the vicinity of neutrality, and a polyacrylamide-based flocculant was added to settle a solid content. The supernatant was removed, the rest was then filtered, and the residue was cleaned and then dried at 110° C. to obtain an intermediate which contained 0.1 wt % of an organic substance which was derived from the flocculant, in terms of C. This intermediate was calcined in nitrogen gas at 750° C. for 1 hour, then was calcined at 450° C. in air, and a titanium oxide fine particle 1 was produced. An average particle size (average primary particle size) of the obtained particles was 220 nm, in a particle size measurement method using a scanning electron microscope.

Subsequently, 50 parts of a phenol resin (monomer/oligomer of phenol resin) (trade name: Priorfen J-325, produced by DIC Corporation, resin solid content: 60%, and density after curing: 1.3 g/cm$^3$) which works as a binder material were dissolved in 35 parts of 1-methoxy-2-propanol which works as a solvent, and a solution was obtained.

To the solution, 60 parts of the titanium oxide fine particle 1 was added; the resultant liquid was used as a dispersion medium, and was charged into a vertical sand mill which used 120 parts of glass beads having an average particle size of 1.0 mm; the mixture was subjected to dispersion treatment under conditions of a dispersion liquid temperature of 23±3° C. and a number of rotations of 1500 rpm (circumferential velocity of 5.5 m/s) for 4 hours; and a dispersion liquid was obtained. The glass beads were removed from the dispersion liquid by a mesh. Into the dispersion liquid from which the glass beads were removed, 0.01 parts of silicone oil (trade name: SH28 PAINT ADDITIVE, produced by Dow Corning Toray Co., Ltd.) as a leveling agent, and 8 parts of a silicone resin particle (trade name: KMP-590, produced by Shin-Etsu Chemical Co., Ltd., average particle size: 2 μm, and density: 1.3 g/cm$^3$) as a surface roughness imparting material were added; the mixture was stirred, and was pressure filtrated using a PTFE filter paper (trade name: PF060, produced by Advantec Toyo Kaisha, Ltd.); and a coating liquid for an electroconductive layer was thereby prepared.

The above described support was dip-coated with the thus prepared coating liquid for the electroconductive layer to form a coating film thereon, the coating film was heated at 150° C. for 20 minutes to be cured, and thereby, the electroconductive layer was formed of which the film thickness was 17 μm.

<Undercoat Layer>

The above described electroconductive layer was dip-coated with the coating liquid for the undercoat layer to form a coating film thereon, which was prepared according to the Preparation Example of the coating liquid 1 for the undercoat layer, the coating film was heated and dried at a temperature of 100° C. for 10 minutes, and thereby, the undercoat layer was formed of which the film thickness was 2 μm. An arithmetic mean roughness Ra, an average length Rsm of a roughness curve element and Ra/Rsm according to JIS B0601:2001 of the obtained undercoat layer are shown in Table 1.

The surface roughness of the undercoat layer in the present disclosure was evaluated according to the following procedure.

The charge transport layer of the produced electrophotographic photosensitive member was dissolved with toluene and dried to expose the surface of the charge generation layer. Next, the exposed charge generation layer of the electrophotographic photosensitive member was dissolved with cyclohexane and dried to expose the surface of the undercoat layer. Furthermore, the electrophotographic photosensitive member from which the surface of the undercoat layer was exposed was cut into a square shape having a side of about 5 mm, and a measurement sample was obtained.

Using a scanning probe microscope JSPM-5200 manufactured by JEOL Ltd., height information was obtained in a square region having one side of 500 nm on the surface of the undercoat layer. For the measurement, a cantilever NCR manufactured by NanoWorld AG was used, and height information was obtained by an operation of scanning the surface in a tapping mode. From the obtained height information, the arithmetic mean roughness Ra, the average length Rsm of the roughness curve element and Ra/Rsm, in JIS B0601:2001, were calculated.

<Charge Generation Layer>

The above described undercoat layer was dip-coated with the coating liquid for the charge generation layer to form a coating film thereon, which was prepared according to the Preparation Example of the coating liquid 1 for the charge generation layer, the coating film was heated and dried at a temperature of 100° C. for 10 minutes, and thereby, a charge generation layer was formed of which the film thickness was 0.2 μm.

<Charge Transport Layer>

A coating liquid for a charge transport layer was prepared by dissolving 5.4 parts of a triarylamine compound represented by the following formula (B-1) as a charge transport material, (B-1)

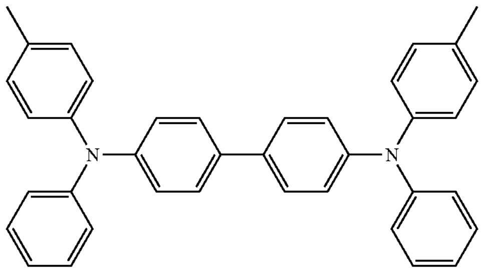

3.6 parts of a triarylamine compound represented by the following formula (B-2), (B-2)

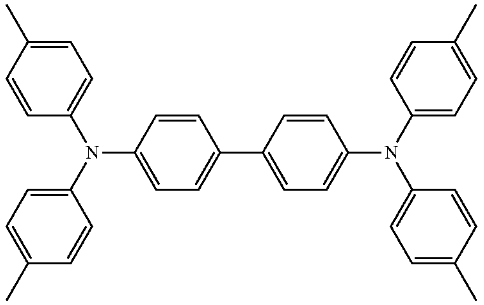

and 10 parts of polycarbonate (trade name: Iupilon Z-400, produced by Mitsubishi Engineering-Plastics Corporation), into a mixed solvent of 25 parts of ortho-xylene/25 parts of methyl benzoate/25 parts of dimethoxymethane.

The above described charge generation layer was dip-coated with the thus prepared coating liquid for the charge transport layer to form a coating film thereon, the coating film was heated and dried at a temperature of 120° C. for 30 minutes, and thereby, the charge transport layer was formed of which the film thickness was 14 μm.

<Protective Layer>

A polymerizable compound represented by the following formula (B-3) in an amount of 9.6 parts, (B-3)

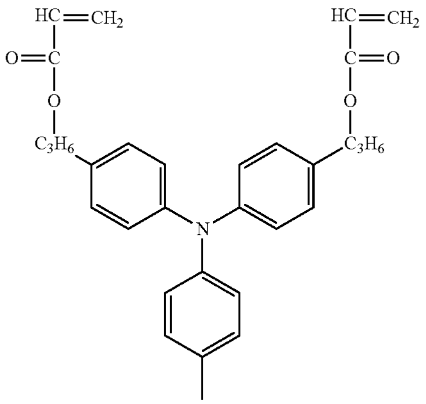

14.4 parts of a polymerizable compound represented by the following formula (B-4), (B-4)

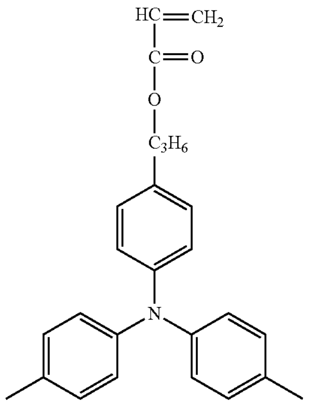

and 1.2 parts of a siloxane-modified acrylic compound (Symac US270, produced by Toagosei Co., Ltd.) were mixed with a mixed solvent of 42 parts of cyclohexane and 18 parts of 1-propanol; and the mixture was stirred. In this way, a coating liquid for a protective layer was prepared.

The charge transport layer was dip-coated with this coating liquid for the protective layer to form a coating film thereon, and the obtained coating film was dried at 35° C. for 4 minutes. After that, under a nitrogen atmosphere, a distance between the support (body to be irradiated) and the electron beam irradiation window was set to 25 mm, and the coating film was irradiated with the electron beam for 4.8 seconds under conditions of an accelerating voltage of 57 kV and a beam current of 5.3 mA, while the support (object to be irradiated) was rotated at a speed of 300 rpm. For information, an absorbed dose of the electron beam at this time was measured, and as a result, was 20 kGy. After that, under a nitrogen atmosphere, the temperature of the coating film was increased from 25° C. to 137° C. over 10 seconds to heat the coating film. A concentration of oxygen in an interval between the electron-beam irradiation and the subsequent heating treatment was 10 ppm or lower. Next, the coating film was naturally cooled in the air until the temperature of the coating film reached 25° C., and was heat-treated for 10 minutes under the condition that the temperature of the coating film became 100° C.: and a protective layer was formed which had a film thickness of 1.9 μm.

Examples 2 to 21

Electrophotographic photosensitive members were produced in the same way as in Example 1 except that the coating liquid for the undercoat layer, the film thickness of the undercoat layer, the coating liquid for the charge generation layer and the film thickness of the charge generation layer in Example 1 were changed as shown in Table 1. The arithmetic mean roughness Ra, the average length Rsm of the roughness curve element, and Ra/Rsm according to JIS B0601:2001 of the obtained undercoat layer are shown in Table 1.

Comparative Examples 1 to 9

Electrophotographic photosensitive members were produced in the same way as in Example 1 except that the coating liquid for the undercoat layer, the film thickness of the undercoat layer, the coating liquid for the charge generation layer and the film thickness of the charge generation layer in Example 1 were changed as shown in Table 1. The arithmetic mean roughness Ra, the average length Rsm of the roughness curve element, and Ra/Rsm according to JIS B0601:2001 of the obtained undercoat layer are shown in Table 1.

TABLE 1

| | Undercoat layer | | | | | | | Charge generation layer | | | |
|---|---|---|---|---|---|---|---|---|---|---|---|
| Example No. | Coating liquid No. | Particle size of titanium oxide particle (nm) | Surface-modifying compound for titanium oxide particle | Film thickness (μm) | Ra/Rsm | Ra (nm) | Rsm (nm) | Coating liquid No. | Small-angle X-ray scattering peak position (nm) | Small-angle X-ray scattering peak half-value width (nm) | Film thickness (μm) |
| Example 1 | 1 | 50 | Methyldimethoxymethane | 2 | 0.23 | 25 | 110 | 1 | 32 | 38 | 0.2 |
| Example 2 | 1 | 50 | Methyldimethoxymethane | 2 | 0.23 | 25 | 110 | 1 | 32 | 38 | 0.15 |
| Example 3 | 1 | 50 | Methyldimethoxymethane | 2 | 0.23 | 25 | 110 | 1 | 32 | 38 | 0.25 |
| Example 4 | 1 | 50 | Methyldimethoxymethane | 2 | 0.23 | 25 | 110 | 2 | 45 | 44 | 0.2 |
| Example 5 | 1 | 50 | Methyldimethoxymethane | 2 | 0.23 | 25 | 110 | 3 | 38 | 41 | 0.2 |
| Example 6 | 1 | 50 | Methyldimethoxymethane | 2 | 0.23 | 25 | 110 | 4 | 30 | 35 | 0.2 |
| Example 7 | 1 | 50 | Methyldimethoxymethane | 2 | 0.23 | 25 | 110 | 5 | 45 | 47 | 0.2 |
| Example 8 | 1 | 50 | Methyldimethoxymethane | 2 | 0.23 | 25 | 110 | 6 | 41 | 46 | 0.2 |
| Example 9 | 2 | 50 | Methyldimethoxymethane | 2 | 0.29 | 35 | 120 | 1 | 32 | 38 | 0.2 |
| Example 10 | 3 | 15 | Methyldimethoxymethane | 1.5 | 0.20 | 15 | 75 | 1 | 32 | 38 | 0.2 |
| Example 11 | 4 | 15 | Methyldimethoxymethane | 1.5 | 0.25 | 20 | 80 | 1 | 32 | 38 | 0.2 |
| Example 12 | 5 | 35 | Methyldimethoxymethane | 2 | 0.20 | 20 | 100 | 1 | 32 | 38 | 0.2 |
| Example 13 | 6 | 35 | Methyldimethoxymethane | 2 | 0.27 | 30 | 110 | 1 | 32 | 38 | 0.2 |
| Example 14 | 7 | 80 | Methyldimethoxymethane | 2.5 | 0.25 | 30 | 120 | 1 | 32 | 38 | 0.2 |
| Example 15 | 8 | 80 | Methyldimethoxymethane | 2.5 | 0.31 | 40 | 130 | 1 | 32 | 38 | 0.2 |
| Example 16 | 9 | 120 | Methyldimethoxymethane | 2.5 | 0.33 | 45 | 135 | 1 | 32 | 38 | 0.2 |
| Example 17 | 2 | 50 | Methyldimethoxymethane | 0.3 | 0.46 | 55 | 120 | 1 | 32 | 38 | 0.2 |
| Example 18 | 2 | 50 | Methyldimethoxymethane | 5 | 0.25 | 30 | 120 | 1 | 32 | 38 | 0.2 |
| Example 19 | 10 | 50 | Vinyltrimethoxymethane | 2 | 0.18 | 20 | 110 | 1 | 32 | 38 | 0.2 |
| Example 20 | 11 | 50 | Vinyltrimethoxymethane | 2 | 0.25 | 30 | 120 | 1 | 32 | 38 | 0.2 |
| Example 21 | 12 | 50 | Unmodified | 2 | 0.39 | 45 | 115 | 1 | 32 | 38 | 0.2 |
| Comparative Example 1 | 1 | 50 | Methyldimethoxymethane | 2 | 0.23 | 25 | 110 | 7 | 43 | 55 | 0.2 |
| Comparative Example 2 | 1 | 50 | Methyldimethoxymethane | 2 | 0.23 | 25 | 110 | 8 | 55 | 48 | 0.2 |
| Comparative Example 3 | 1 | 50 | Methyldimethoxymethane | 2 | 0.23 | 25 | 110 | 9 | 53 | 60 | 0.2 |
| Comparative Example 4 | 1 | 50 | Methyldimethoxymethane | 2 | 0.23 | 25 | 110 | 10 | 60 | 59 | 0.2 |
| Comparative Example 5 | 13 | 15 | Methyldimethoxymethane | 1.5 | 0.56 | 45 | 80 | 1 | 32 | 38 | 0.2 |
| Comparative Example 6 | 14 | 15 | Methyldimethoxymethane | 2.5 | 0.07 | 5 | 70 | 1 | 32 | 38 | 0.2 |
| Comparative Example 7 | 15 | 35 | Methyldimethoxymethane | 2 | 0.48 | 55 | 115 | 1 | 32 | 38 | 0.2 |

TABLE 1-continued

| | Undercoat layer | | | | | | | | Charge generation layer | | | |
|---|---|---|---|---|---|---|---|---|---|---|---|---|
| Example No. | Coating liquid No. | Particle size of titanium oxide particle (nm) | Surface-modifying compound for titanium oxide particle | Film thickness (μm) | Ra/Rsm | Ra (nm) | Rsm (nm) | Coating liquid No. | Small-angle X-ray scattering peak position (nm) | Small-angle X-ray scattering peak half-value width (nm) | Film thickness (μm) |
| Comparative Example 8 | 16 | 80 | Methyldimethoxymethane | 2.5 | 0.52 | 70 | 135 | 1 | 32 | 38 | 0.2 |
| Comparative Example 9 | 17 | 80 | Methyldimethoxymethane | 2.5 | 0.09 | 10 | 115 | 1 | 32 | 38 | 0.2 |

<Evaluation of Electrophotographic Photosensitive Member>

The electrophotographic photosensitive member produced in the above Examples 1 to 21 and Comparative Examples 1 to 9 were subjected to the following evaluations. The results are shown in Table 2.

<Initial Potential and Potential after Endurance of 10,000 Sheets>

As an electrophotographic apparatus for evaluation, a monochrome direct transfer printer was adopted. A modified machine of a laser beam printer (trade name: HP LaserJet Enterprise M612dn) was used which was manufactured by HP Inc. As for modification points, the printer was modified so as to be capable of adjusting and measuring a voltage to be applied to a charging roller, and adjusting and measuring an amount of image exposure light.

Firstly, the image forming apparatus and the electrophotographic photosensitive member were left in an environment at a temperature of 15° C. and a relative humidity of 10% RH for 24 hours or longer, and then the electrophotographic photosensitive member of each of Examples 1 to 21 and Comparative Examples 1 to 9 was mounted in a cartridge of the image forming apparatus.

As evaluation of repeated use, images were continuously output on 10000 sheets of A4 size plain paper using a test chart having a print ratio of 1%. As the charging condition, a dark portion potential was adjusted to −500V, and as the exposure condition, the amount of the image exposure light was adjusted to 0.2 $\mu J/cm^2$ A light portion potential (Vl) was evaluated before the above repeated use and after the above repeated use. The surface potential of the photosensitive member was measured by modifying the cartridge and mounting a potential probe (trade name: model 6000B-8, manufactured by Trek Japan Co., Ltd.) at a development position. The potential was measured using a surface potential meter (trade name: model 344, manufactured by Trek Japan Co., Ltd.).

As can be seen from the results in Table 2, in Examples 1 to 21, the potential difference between the initial potential and the potential after endurance of 10000 sheets was 16 V or smaller, and on the other hand, in Comparative Examples 1 to 9, the potential difference between the initial potential and the potential after endurance of 10000 sheets was 20 V or larger.

<Transfer Memory>

As an electrophotographic apparatus for evaluation, a monochrome direct transfer printer was adopted. A laser beam printer manufactured by HP Inc. (trade name: HP LaserJet Enterprise M612dn) was prepared; and the printer was modified so that adjustment of a voltage to be applied to a charging roller, a voltage to be applied to a transfer roller, and an amount of the image exposure light, adjustment of an amount of pre-exposure, and transfer bias control in an inter-paper portion can be invalidated, and further modified so that the transfer roller was connected to a high-voltage power supply (Model 615-3, manufactured by Trek Japan) and a voltage could be applied to the transfer roller from the outside of the LBP. Firstly, the image forming apparatus and the electrophotographic photosensitive member were left in an environment at a temperature of 23° C. and a relative humidity of 50% RH for 24 hours or longer, and then the electrophotographic photosensitive member produced in each of Examples 1 to 21 and Comparative Examples 1 to 9 was mounted in a cartridge of the image forming apparatus.

The voltage applied to the charging roller and the amount of the image exposure light to the electrophotographic photosensitive member were set so that the dark portion potential became −500 V and the light portion potential became −100 V. The pre-exposure was not used. A device which had a potential probe (trade name: Model 6000B-8, manufactured by Trek Japan) mounted at a development position of the process cartridge was used for measurement of the surface potential of the electrophotographic photosensitive member at the time when the electric potential was set, and the surface potential was measured using the surface potential meter (trade name: Model 344, manufactured by Trek Japan). In addition, the voltage applied to the transfer roller at the time of image formation was set to +3000V using an external power supply.

Next, a halftone image of 1 dot and 4 spaces was continuously output on two sheets of A4 size plain paper. When the image is transferred onto the first sheet, there exists a sheet, but in an interval between the first sheet and the second sheet, the electrophotographic photosensitive member and the transfer roller directly contact each other. A black spot appears at a leading end of the second sheet due to an influence of the memory which the photosensitive member received during the transfer sheet interval. Black spots in the output image were visually observed, and the transfer memory was evaluated according to the following criteria.

Rank A: the transfer memory does not exist.

Rank B: the transfer memory exists but is not conspicuous.

Rank C: the transfer memory exists and is conspicuous.

Rank D: the degree of the transfer memory is severe, and a black band is formed.

TABLE 2

| | Evaluation results | | |
|---|---|---|---|
| Example No. | Initial VI (V) | VI (V) after endurance of 10,000 sheets | Transfer memory visual rank |
| Example 1 | −65 | −75 | A |
| Example 2 | −85 | −96 | A |
| Example 3 | −60 | −72 | A |
| Example 4 | −85 | −96 | A |
| Example 5 | −75 | −85 | A |
| Example 6 | −62 | −78 | A |
| Example 7 | −80 | −90 | A |
| Example 8 | −85 | −94 | A |
| Example 9 | −66 | −74 | B |
| Example 10 | −65 | −77 | A |
| Example 11 | −68 | −77 | A |
| Example 12 | −64 | −76 | A |
| Example 13 | −80 | −91 | B |
| Example 14 | −68 | −78 | A |
| Example 15 | −71 | −86 | B |
| Example 16 | −80 | −90 | B |
| Example 17 | −65 | −70 | B |
| Example 18 | −86 | −98 | A |
| Example 19 | −64 | −70 | A |
| Example 20 | −63 | −70 | A |
| Example 21 | −86 | −101 | B |
| Comparative Example 1 | −112 | −136 | C |
| Comparative Example 2 | −125 | −150 | C |
| Comparative Example 3 | −129 | −158 | D |
| Comparative Example 4 | −138 | −162 | D |
| Comparative Example 5 | −105 | −135 | D |
| Comparative Example 6 | −121 | −147 | D |
| Comparative Example 7 | −101 | −131 | D |
| Comparative Example 8 | −119 | −140 | D |
| Comparative Example 9 | −125 | −145 | D |

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-130197, filed Aug. 6, 2021, which is hereby incorporated by reference herein in its entirety.

What is claimed is:

1. An electrophotographic photosensitive member, comprising:

a support, an undercoat layer, a charge generation layer and a charge transport layer in this order;

the charge transport layer containing a charge transport material;

the undercoat layer comprising a polyamide resin and a titanium oxide fine particle; and the charge generation layer comprising a hydroxygallium phthalocyanine pigment, wherein Ra≤50 and 0.1≤Ra/Rsm≤0.5 when on the surface of the undercoat layer, Ra (nm) is an arithmetic mean roughness and Rsm (nm) is an average length of a roughness curve element according to JIS B0601:2001 the hydroxygallium phthalocyanine pigment comprises crystal particles having a crystal form that exhibits peaks at 7.4°±0.3° and 28.2°±0.3° at Bragg angles 2θ in a spectrum of X-ray diffraction using a CuKα ray, and a peak having a half-value width of 50 nm or smaller exists in a range of 20 to 50 nm in a size distribution of the crystal particles measured using small-angle X-ray scattering.

2. The electrophotographic photosensitive member according to claim 1, wherein Ra is 30 nm or smaller.

3. The electrophotographic photosensitive member according to claim 1, wherein the titanium oxide fine particle has an average primary particle size of 10 to 100 nm.

4. The electrophotographic photosensitive member according to claim 1, wherein the titanium oxide fine particle has an average primary particle size of 30 to 60 nm.

5. The electrophotographic photosensitive member according to claim 1, wherein the undercoat layer has a film thickness of 0.5 to 3.0 μm.

6. The electrophotographic photosensitive member according to claim 1, wherein the charge generation layer has a film thickness of 0.15 μm or larger.

7. A process cartridge integrally supporting an electrophotographic photosensitive member and comprising:

at least one unit selected from the group consisting of a charging unit, a developing unit, a transfer unit and a cleaning unit, the process cartridge being detachably attachable to a main body of an electrophotographic apparatus;

the electrophotographic photosensitive member comprising a support, an undercoat layer, a charge generation layer and a charge transport layer in this order;

the charge transport layer containing a charge transport material;

the undercoat layer comprising a polyamide resin and a titanium oxide fine particle; and the charge generation layer comprising a hydroxygallium phthalocyanine pigment, wherein Ra≤50 and 0.1≤Ra/Rsm≤0.5 when on the surface of the undercoat layer, Ra (nm) is an arithmetic mean roughness and Rsm (nm) is an average length of a roughness curve element according to JIS B0601:2001 the hydroxygallium phthalocyanine pigment comprises crystal particles having a crystal form that exhibits peaks at 7.4°±0.3° and 28.2°±0.3° at Bragg angles 2θ in a spectrum of X-ray diffraction using a CuKα ray, and a peak having a half-value width of 50 nm or smaller exists in a range of 20 to 50 nm in a size distribution of the crystal particles measured using small-angle X-ray scattering.

8. An electrophotographic apparatus, comprising:

an electrophotographic photosensitive member;

a charging unit;

an exposure unit;

a developing unit; and a transfer unit;

the electrophotographic photosensitive member comprising a support, an undercoat layer, a charge generation layer and a charge transport layer in this order;

the charge transport layer containing a charge transport material;

the undercoat layer comprising a polyamide resin and a titanium oxide fine particle; and the charge generation layer comprising a hydroxygallium phthalocyanine pigment, wherein Ra≤50 and 0.1≤Ra/Rsm≤0.5 when on the surface of the undercoat layer, Ra (nm) is an arithmetic mean roughness and Rsm (nm) is an average length of a roughness curve element according to JIS B0601:2001 the hydroxygallium phthalocyanine pigment comprises crystal particles having a crystal form that exhibits peaks at 7.4°±0.3° and 28.2°±0.3° at Bragg angles 2θ in a spectrum of X-ray diffraction using a CuKα ray, and a peak having a half-value width of 50 nm or smaller exists in a range of 20 to 50 nm in a size distribution of the crystal particles, which is measured using small-angle X-ray scattering.

9. The electrophotographic photosensitive member according to claim 1, wherein the hydroxygallium phthalocyanine pigment comprises crystal particles having N-methylformamide.

* * * * *